(12) United States Patent
Pasternak

(10) Patent No.: US 9,511,823 B2
(45) Date of Patent: Dec. 6, 2016

(54) IN-LINE MECHANICAL DISCONNECT DEVICE

(71) Applicant: Delmar Systems, Inc., Broussard, LA (US)

(72) Inventor: Jason David Pasternak, Houston, TX (US)

(73) Assignee: DELMAR SYSTEMS, INC., Broussard, LA (US)

(*) Notice: Subject to any disclaimer, the term of this patent is extended or adjusted under 35 U.S.C. 154(b) by 0 days.

(21) Appl. No.: 14/396,433

(22) PCT Filed: Apr. 24, 2013

(86) PCT No.: PCT/US2013/037959
§ 371 (c)(1),
(2) Date: Oct. 23, 2014

(87) PCT Pub. No.: WO2013/163280
PCT Pub. Date: Oct. 31, 2013

(65) Prior Publication Data
US 2015/0158555 A1   Jun. 11, 2015

Related U.S. Application Data

(60) Provisional application No. 61/638,262, filed on Apr. 25, 2012.

(51) Int. Cl.
*B63B 21/08* (2006.01)
*F16G 15/04* (2006.01)

(52) U.S. Cl.
CPC ............... *B63B 21/08* (2013.01); *F16G 15/04* (2013.01)

(58) Field of Classification Search
CPC .................................. B63B 21/08; F16G 15/04
USPC ........................................................ 114/230.3
See application file for complete search history.

(56) References Cited

U.S. PATENT DOCUMENTS

| | | | | |
|---|---|---|---|---|
| 3,602,959 A | * | 9/1971 | Perez | B63B 22/06 102/413 |
| 3,848,226 A | * | 11/1974 | Perez | B63C 7/26 294/66.1 |
| 4,459,930 A | * | 7/1984 | Flory | B63B 22/021 114/230.14 |
| 5,022,013 A | * | 6/1991 | Dalton | H04B 13/02 367/4 |
| 5,159,743 A | * | 11/1992 | Somerville | B25B 27/026 29/252 |

(Continued)

*Primary Examiner* — Lars A Olson
*Assistant Examiner* — Jovon Hayes
(74) *Attorney, Agent, or Firm* — Law Office of Jesse D. Lambert, LLC

(57) ABSTRACT

A disconnect device, suitable for placement into a mooring line connecting a floating vessel to an anchor, has a pair of rotably connected lever arm members. In a first, closed position, the lever arm members are held closed by a shear pin. Mating slots in each lever arm member capture a mooring line component, such as the pin of a shackle, when the lever arm members are closed. A cylindrical centering device is placed in the mooring line between the disconnect device and the vessel, and bears against the lever arm members. Force applied to the centering device, whether by pulling it into a surface fairlead sheave or similar device, or by a subsea chaser device, forces the lever arm members apart, breaking the shear pin and releasing the device, thus disconnecting the mooring line.

20 Claims, 21 Drawing Sheets

(56) References Cited

U.S. PATENT DOCUMENTS

| | | | | |
|---|---|---|---|---|
| 5,219,245 A * | 6/1993 | Chin-Yee | ................... | B63C 7/22 |
| | | | | 405/188 |
| 5,418,757 A * | 5/1995 | Rau | ...................... | G10K 11/006 |
| | | | | 367/4 |
| 5,513,886 A * | 5/1996 | Cyr | ......................... | B63B 22/06 |
| | | | | 294/66.1 |
| 5,540,175 A * | 7/1996 | Van Den Haak | ....... | B63B 21/22 |
| | | | | 114/293 |
| 6,379,202 B1 * | 4/2002 | Liu | ......................... | B63B 22/06 |
| | | | | 294/66.1 |
| 6,609,283 B1 * | 8/2003 | Somerville | ........... | B25B 27/023 |
| | | | | 29/255 |
| 7,160,166 B2 * | 1/2007 | Humphreys | ............ | B63B 22/00 |
| | | | | 4/504 |
| 7,187,623 B2 * | 3/2007 | Green | ................... | H04B 13/02 |
| | | | | 367/133 |
| 7,886,681 B2 * | 2/2011 | Weinstein | ............... | B63B 21/46 |
| | | | | 114/299 |
| 2015/0158555 A1 * | 6/2015 | Pasternak | ................ | F16G 15/04 |
| | | | | 114/230.3 |

* cited by examiner

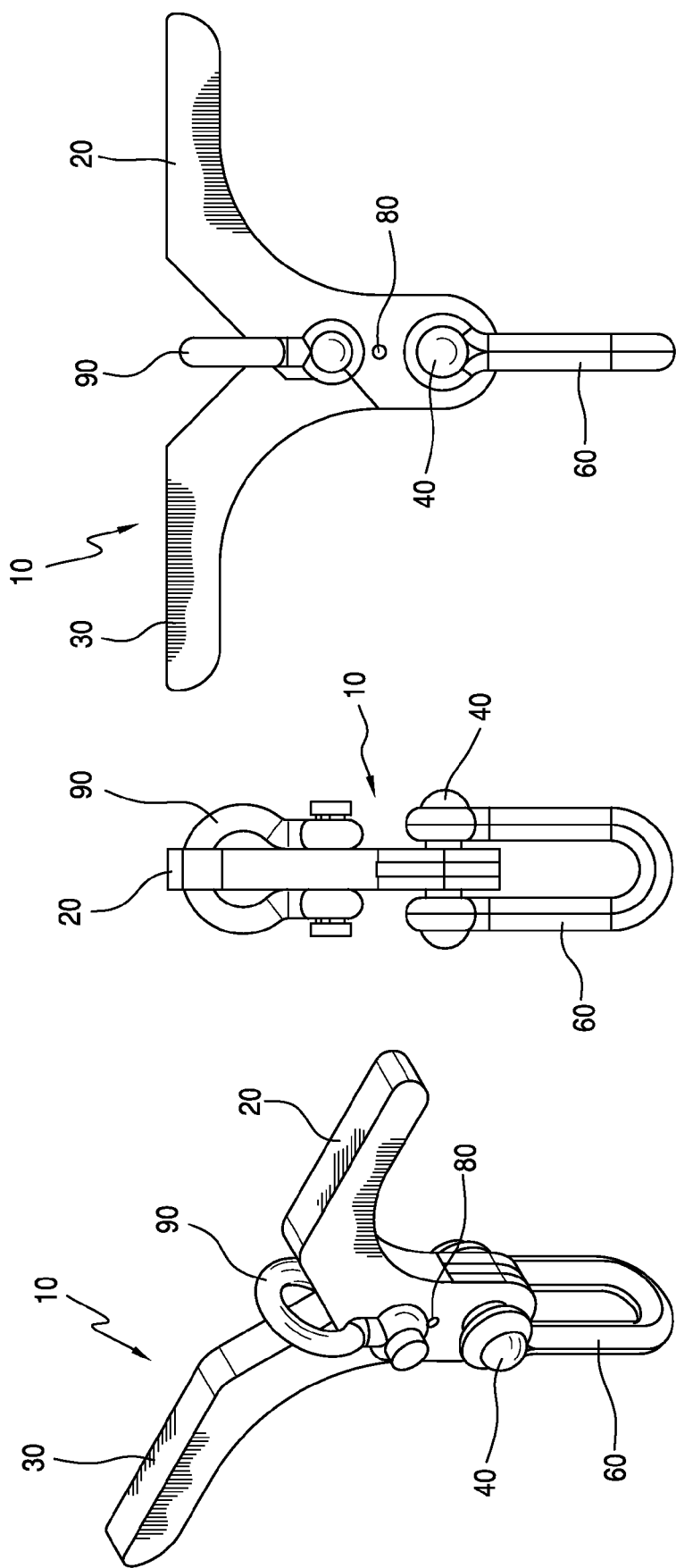

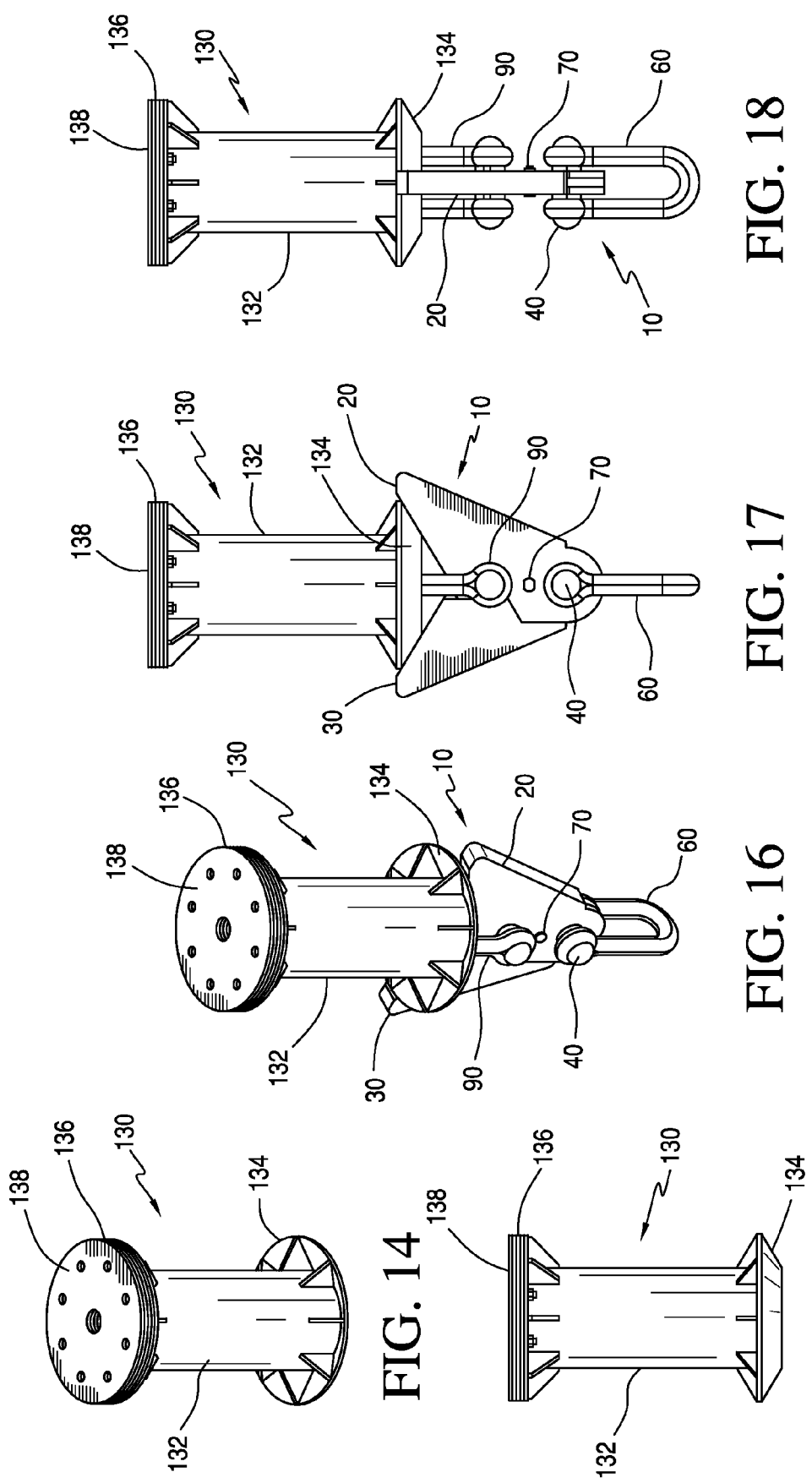

IN-LINE MECHANICAL DISCONNECT DEVICE

CROSS REFERENCE TO RELATED APPLICATIONS

This regular United States patent application claims priority to U.S. provisional patent application Ser. No. 61/638,262, filed Apr. 25, 2012, for all purposes.

BACKGROUND

In a variety of settings, it is desirable to be able to quickly disconnect a tension member. For example, in marine environments, various types of moored vessels are held in place by mooring lines connecting the vessel to an anchor on or in the seafloor. Various operational situations may require that the vessel be quickly released from the anchor, including but not limited to ice drift avoidance in arctic drilling, vessel offset for subsea intervention during disasters, etc. Preferably, this release can be accomplished by disconnecting the vessel from the anchor, rather than by recovering the anchor and associated mooring equipment from the seafloor by use of a secondary vessel, which is time consuming. Similar situations arise when a vessel is moored or tied to a piling, platform or similar structure. Further, the release can preferably be accomplished by mechanical means while the mooring line is under tension.

Other non-marine and non-mooring settings may benefit from an in-line mechanical disconnect device, including but not limited to tension members used to tether objects in place, to support structures during construction, etc.

SUMMARY OF THE INVENTION

The in-line mechanical disconnect device, referred to at times herein as "disconnect device," embodying the principles of the present invention is placed in a tension member as an element in the tension member, which may be a mooring line, between the anchor point and the object being fixed in place, for example a floating vessel (which may be a rig or any other vessel). While the present invention has broad application in both marine and non-marine environments, and for a variety of purposes in addition to mooring, for illustrative purposes the invention will be described in connection with a marine mooring setting, namely mooring a vessel to an anchor on or in the seafloor or to some other anchor point (piling, platform, dock, etc.).

In such setting, the disconnect device serves as an element in the overall mooring line from the vessel to the anchor, and provides a mechanical means for disconnecting the mooring line.

The disconnect device comprises a pair of hinged together, rotatable lever arm members. The lever arm members are rotatable between first and second positions. In the first position, the lever arm members are rotated to a "closed" position and held in that position by a means for holding the lever arm members in the first closed position, which may be a shear pin inserted through aligned holes in the lever arm members; alternatively, a ball and detent or other arrangement could be used. A top connecting piece or retained member is captured by a pair of slots, one slot in each lever arm member, forming a hole when the lever arm members are in this first position. The retained member is in turn connected to a mooring line, which may be the upper mooring line section running from the disconnect device up to the vessel or other floating structure being moored. The remaining or lower section of mooring line connects the disconnect device with the anchor point or foundation; typically, a pin and shackle provide the rotatable connector for the lever arm members and the means to connect the disconnect device to the lower mooring line section. A pin and shackle may also comprise the retained member, with the pin captured in the slots as described.

In one embodiment, the lever arm members comprise two laterally extending lever arms, forming a force receiving profile. When force is applied to these lever arms, for example by pulling the disconnect device into a release member such as a surface fairlead sheave, or by force applied subsea by a hook, collar, ring or similar means ("chaser" device), the shear pin shears, and the lever arms rotate to a second position, separating the slots and allowing the retained member to disengage from the lever arm members. The mooring line is thus disconnected.

In another embodiment, the force receiving profile of the lever arm members preferably forms a "V" shape, on the surfaces engaging the release member, such as the surface fairlead sheave, or chaser device applying force subsea. In this embodiment, the disconnect device preferably further comprises a cylindrical centering device, disposed around the retained member and the section of the mooring line from the disconnect device to the structure being moored (upper mooring line section). The centering device preferably has a base profile, which may be a partial conical section on one end, that is, the end which butts up against the "V" shaped force receiving profile of the lever arm members. Preferably, the angles of the force receiving profile formed by the lever arm members and the partial conical lower end of the centering device are roughly equal, so as to create a seated structural arrangement between the two pieces. The other end of the centering device preferably comprises a top plate which keeps the centering device from sliding off the mooring line, and a resilient bumper surface. When the disconnect device is pulled into a release member such as a surface fairlead sheave, one end of the centering device contacts the sheave, and transfers force to the other, partly conical lower end and then to the force receiving profile of the lever arm members, forcing them apart, breaking the shear pin and opening the disconnect device. Similarly, in a subsea disconnect procedure, the subsea force transfer device (hook, collar, ring or similar means, namely the "chaser" device) contacts the disconnect device and applies force to the centering device (whether directly to the force receiving profile or first to the centering device), opening the disconnect device as previously described. The centering device enables force transfer to the lever arm members while avoiding issues with the retained member (and/or associated components) contacting the surface fairlead sheave, chaser device or other device and interfering with contact with the lever arm members (and thus with release of the device). The invention further comprises methods of use of the disconnect device in different manners of triggering or releasing same.

BRIEF DESCRIPTION OF THE DRAWINGS

FIGS. 3, 4, and 5 show isometric, side, and front views, respectively, of one embodiment of the disconnect device, along with exemplary associated rigging hardware.

FIGS. 14 and 15 show perspective and side views of the centering device.

FIGS. 16-18 show different views of an embodiment of the disconnect device, along with the centering device in place and exemplary associated rigging hardware.

DESCRIPTION OF THE PRESENTLY PREFERRED EMBODIMENTS

While various embodiments are possible within the scope of the present invention, in connection with the drawings some of the presently preferred embodiments can be described. As noted above, while the invention has broad applicability to any setting in which it is desired to have a quick means to disconnect a tension member, for illustrative purposes only, its use in a marine environment, for the mooring of vessels, will be described. It is to be understood that in addition to mooring of vessels, the disconnect device can be used to connect two vessels (by placement of same in connecting lines or hawsers) or to connect one or more vessels to a dock, platform or other fixed structure. The scope of the invention is intended to cover all of these settings. The apparatus provides a more reliable way for an offshore drilling vessel, or other moored vessel, to rapidly disconnect its tensioned mooring lines during an emergency. This allows the moored vessel to offset quickly from location by disconnecting its mooring lines, rather than recovering them using conventional anchor handling methods from a secondary vessel.

One Embodiment of the Apparatus

Figure 2:
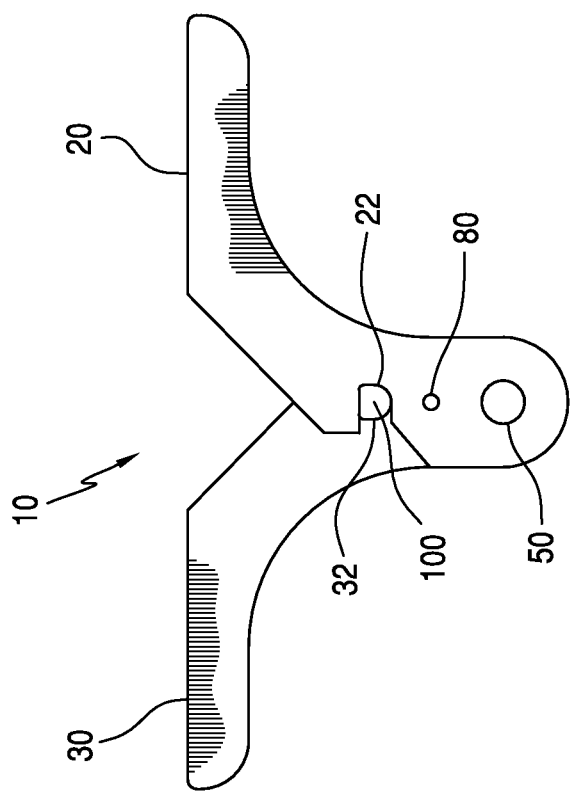
FIGS. 1 and 2 show isometric and front views, respectively, of one embodiment of an in-line mechanical disconnect device embodying the principles of the present invention.
Figure 1:
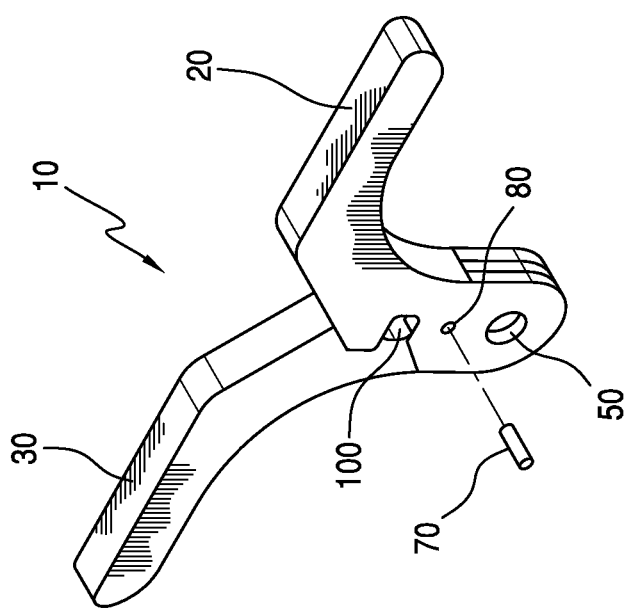
Figure 7:
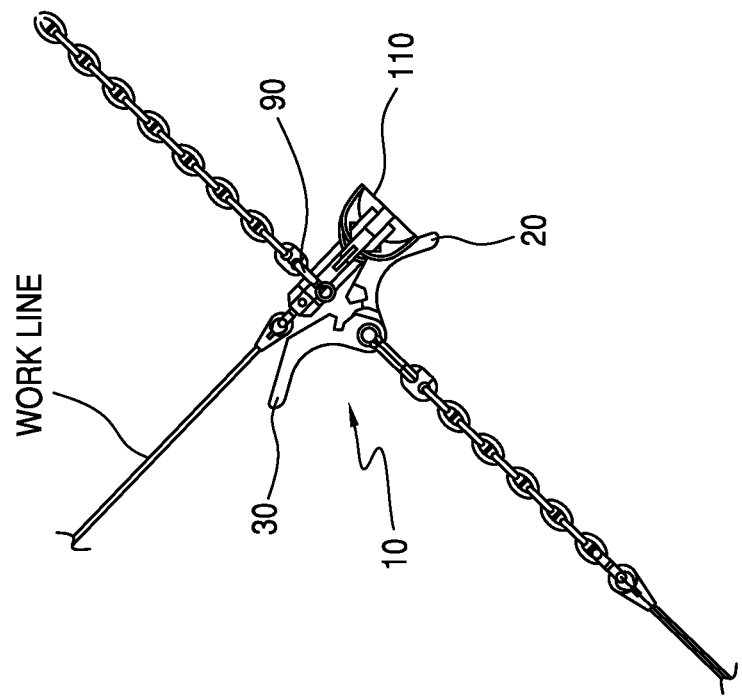
FIGS. 6 and 7 show views of one embodiment of the disconnect device before and after, respectively, disconnect by means of a subsea device.
Figure 6:
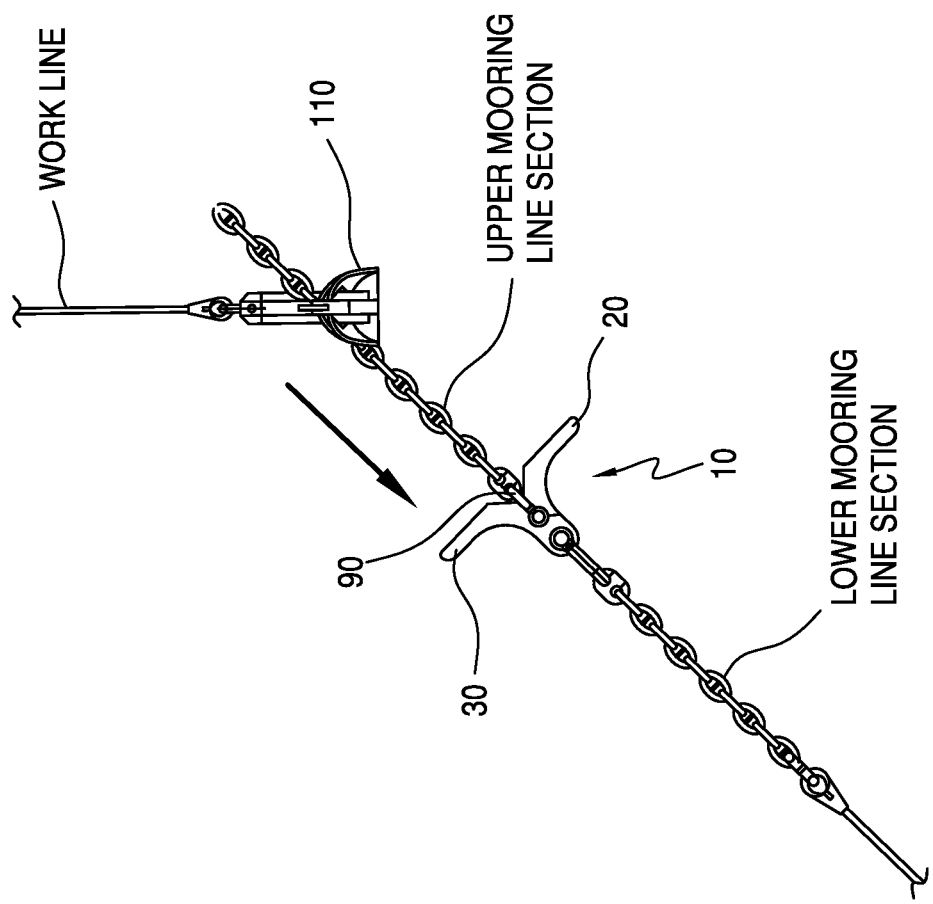

The in-line mechanical disconnect device 10, FIGS. 1 and 2, is a mechanically operated mooring line disconnect mechanism, at times referred to as a "quick release," for use in marine mooring systems. Disconnect device 10 is positioned in a mooring line at a desired location, with the upper section of mooring line extending from the disconnect device to the vessel, and the lower section extending from the disconnect device to the anchor. FIGS. 6 and 7 show an exemplary placement of the disconnect device in a mooring line.

Referring to FIGS. 1-5, disconnect device 10 comprises two lever arm members 20 and 30, rotatably connected by a pin 40 or similar means (bolt, shackle, etc.) inserted through mating holes 50 in lever arm members 20 and 30. Preferably, pin 40 may comprise part of a shackle 60, as can be seen in FIGS. 3-5, which provides a means for connecting disconnect device 10 to the lower section of mooring line. As can be seen, in the preferred embodiment, lever arm members 20 and 30 interlock and rotate about the bottom pivot hole 50. Mating slots 22 and 32 in lever arm members 20 and 30 form a retaining hole 100 when the lever arm members are in a first position, as shown in FIGS. 1, 2. Center hole 80 is formed from aligned holes in lever arm members 20 and 30 when in a first or closed position, as in FIGS. 1 and 2.

A means for holding the lever arm members in the first, closed position is provided. In a presently preferred embodiment, the means comprises a shear pin 70 is inserted into the center hole 80, as can be seen in FIGS. 1 and 2, to hold lever arm members 20 and 30 in a first or closed position (as in FIGS. 1-5) and to prevent premature release during handling and installation. Shear pin 70 must be broken, and any friction between the various components must be overcome (whether by subsurface intervention or winching, as described in connection with FIGS. 5-9) in order to rotate lever arm members 20 and 30 to a second, open position. It is understood that the means for holding the lever arm members in the first, closed position may take other structural forms, including but not limited to a ball and detent or other means known in the art.

Figure 8:
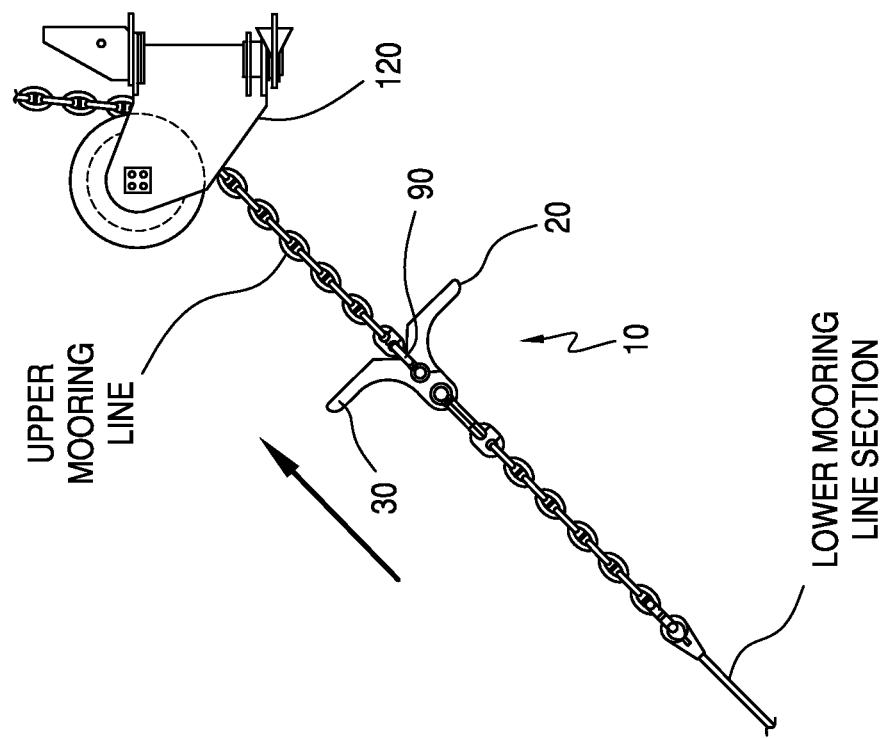

An exemplary use of the disconnect can be described with reference to FIGS. 3, 4 and 5. The disconnect device (without shear pin 70 in place) is first "opened" by rotating lever arm members 20 and 30 a sufficient amount to permit the retained member, in this example the pin of shackle 90, to be placed into one of slots 22 or 32, then rotated closed to a first position, as in FIG. 2. Shackle 90 is then retained in retaining hole 100. Shear pin 70 is then inserted through hole 80. It can be appreciated that the disconnect device 10 is now ready to be connected into the mooring line by shackles 60 and 90. FIG. 6 and FIG. 8 shows disconnect device 10 in place in the overall mooring line.

FIG. 7 illustrates a subsea opening or release of disconnect device 10. In this example, the release member comprises a hook, collar, ring or other suitable means known in the art, commonly referred to as a chaser device, designated 110, is lowered on a work line from a secondary or intervention vessel and run down the upper mooring line section until it contacts the force receiving profile of disconnect device 10. Force is thus applied to lever arms 20 and 30, which extend laterally from the axis of mooring load. Sufficient force is applied to break shear pin 70 and overcome any friction loads, then move lever arm members 20 and 30 to a second, open position, as shown in FIG. 7. When the disconnect device is thus triggered, the retained member, in this example shackle 90, is no longer captured within hole 100 formed by mating slots 22, 32 and is thus disconnected from disconnect device 10, in turn disconnecting the mooring line and freeing the vessel from the anchor.

Figure 9:
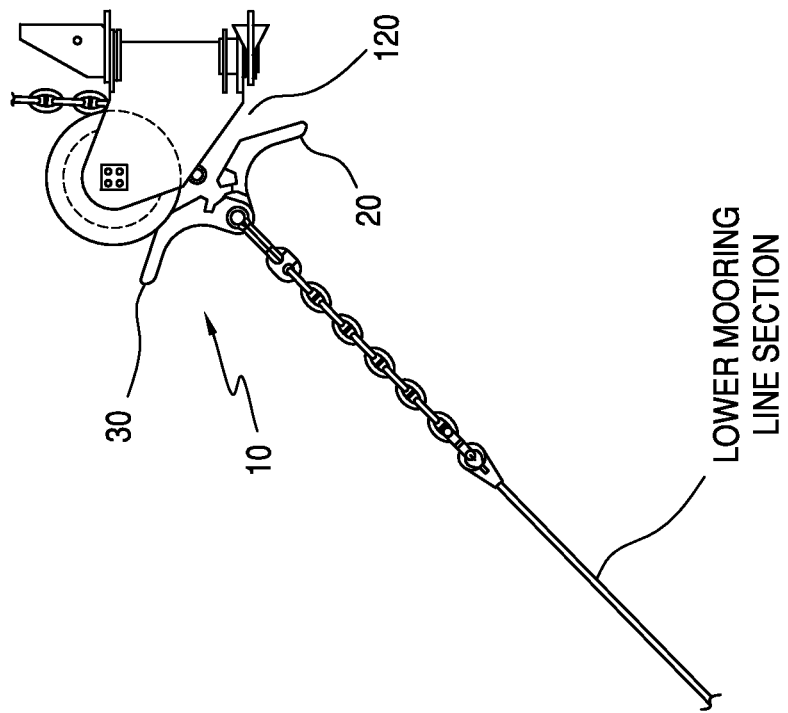
FIGS. 8 and 9 show views of one embodiment of the disconnect device before and after, respectively, disconnect by means of pulling the disconnect device into a surface fairlead sheave.

Alternatively, disconnect device 10 can be released by pulling it into a release member, namely winching the lever arm members 20 and 30 into contact with a surface fairlead sheave 120, as seen in FIGS. 8 and 9. In this example, the force receiving profile of lever arm members 20 and 30 contact surface fairlead sheave 120, and continued pulling forces lever arm members 20 and 30 to the second, released position and disconnecting the mooring line, as in FIG. 9. It is to be understood that other types of release members comprising surface structures or "choke points" would serve to release the disconnect device as it is pulled into the structure, including but not limited to those known as bending shoes or other types of fairlead devices, and including such simple structures as a pair of spaced apart bollards situated on a dock, other vessel, etc. It is further understood that the force receiving profile of lever arms 20 and 30 is formed from the surfaces of those members which come into contact with the release member.

A Second Embodiment of the Apparatus

Referring to FIGS. 10 through 18, a second embodiment of the apparatus can be described. In this embodiment, disconnect device 10 preferably has somewhat differently shaped lever arm surfaces, forming a differently shaped force receiving profile, and further comprises a centering device which aids in force transfer from the release member (whether a surface fairlead sheave or other surface or subsurface device), to the lever arms. Generally, element numbers refer to the same structural elements as in the description of the first embodiment.

Figure 11:
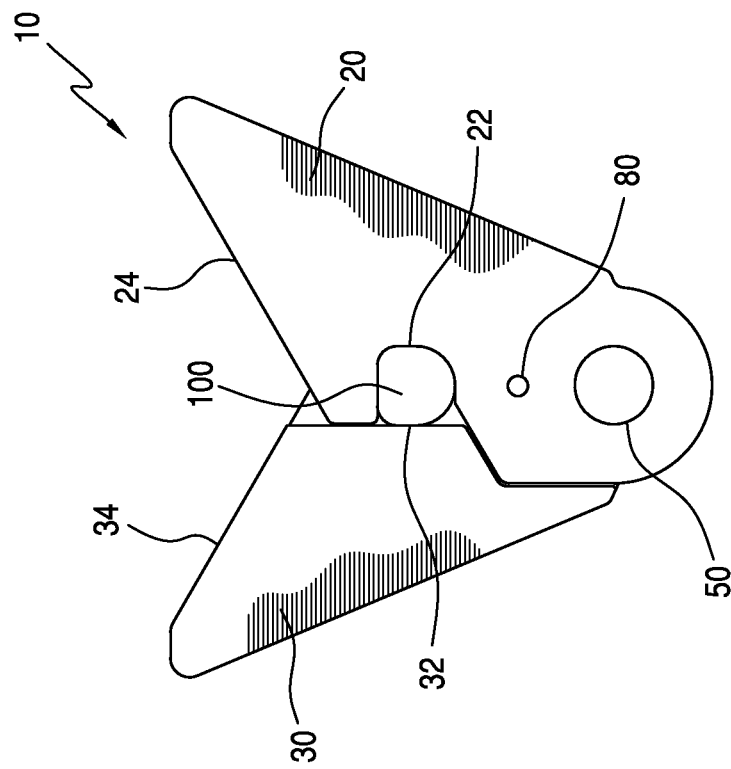
FIGS. 10 and 11 show perspective and front views, respectively, of another embodiment of the disconnect device.
Figure 10:
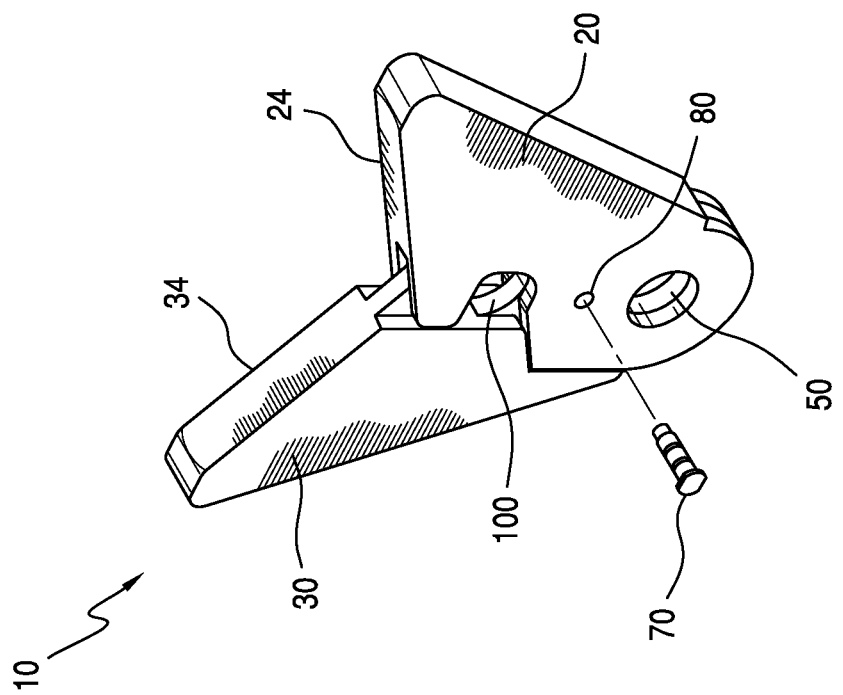
Figure 13:
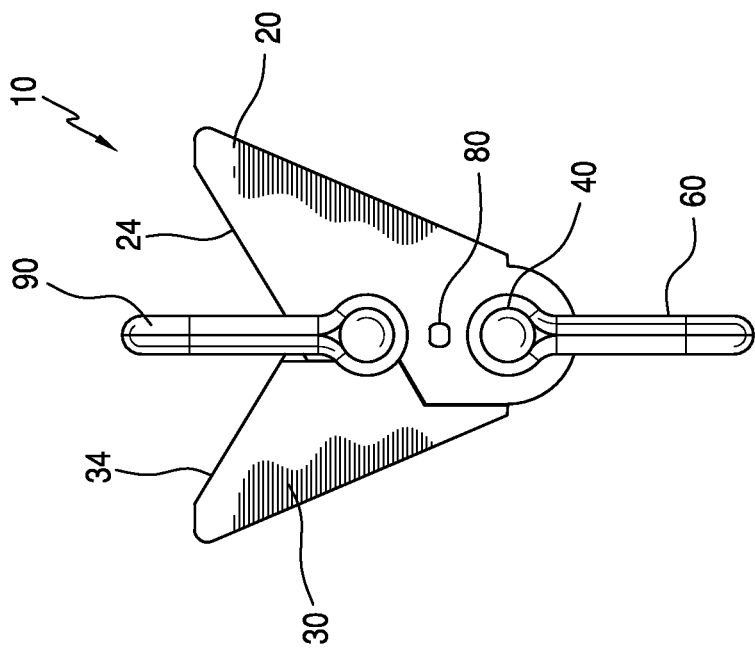
FIGS. 12 and 13 show perspective and front views, respectively, of the embodiment of FIGS. 10 and 11, along with associated rigging hardware.
Figure 12:
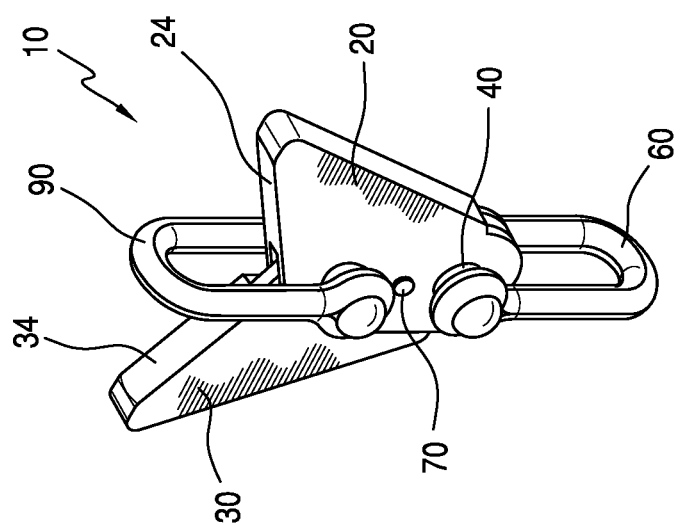

Referring to FIGS. 10 and 11, lever arm members 20 and 30 are rotatably connected by a pin, bolt or shackle, represented by element 60 in FIGS. 12 and 13, inserted through hole 50. As can be seen in the figures, especially FIGS. 10 and 11, the surfaces 24 and 34 of lever arm members 20 and 30 distal from hole 50, and (generally) facing the structure being moored, form the force receiving profile, and are preferably angled so as to form a "V" shaped profile. As with the first embodiment, lever arm members 20 and 30 further comprise matching slots 22 and 32, which form a retaining hole 100 when lever arm members 20 and 30 are rotated together as seen in FIGS. 10 and 11.

A means for holding the lever arm members in the first, closed position is provided, which as with the first embodiment may comprise a shear pin 70 inserted into the center hole 80 (which represents aligned holes in the lever arm member when they are in the first, closed position), as can be seen in FIGS. 10 and 11, to hold lever arm members 20 and 30 in a first or closed position (as in FIGS. 10 and 11) and to prevent premature release during handling, installation and normal operation. Shear pin 70 must be broken, and any friction between the various components must be overcome by a release member (whether by subsurface intervention or winching, as described in connection with FIGS. 19-22) in order to rotate lever arm members 20 and 30 to a second, open position.

FIGS. 12 and 13 show the apparatus in a closed position. Lever arm members 20 and 30 are rotated to a closed position, trapping the retained member, in this case pin of shackle 90, in retaining hole 100. Shear pin 70 is inserted through hole 80 (aligned holes in the lever arm members), thus locking the apparatus together. Shackle 60 (including its pin 40) provide the pivot point around which lever arm members 20 and 30 rotate.

This embodiment of disconnect device 10 further comprises centering device 130, as can be seen in FIGS. 14-18. Generally, in a preferred embodiment, centering device 130 comprises an elongated cylindrical body 132, with a base profile 134, in this example forming a partly conical base shape, having a cross-section shape or angle which generally matches the force receiving surface of the lever arm members, namely angled surfaces 24 and 34 of lever arm members 20 and 30, as can be best seen in FIG. 17. Centering device 130 also comprises a top plate 136, which as later described is the surface which the release member bears against, whether the release member is a surface fairlead sheave or subsea "chaser" device (later described), and transmits force to the force receiving profile, namely angled surfaces 24 and 34. Top plate 136 may be "split" (two half circles) for ease in installing same around the mooring line, when the mooring line is already in place within centering device 130. Sufficient force breaks shear pin 70, opening lever arm members 20 and 30 and releasing the retained member, namely shackle 90. Preferably, top plate 136 comprises a resilient bumper surface 138. Centering device 130 is sufficiently long to encase a portion of shackle 90, and any other associated connecting tackle above same. In that manner, top plate 136 and/or bumper 138 contacts the release member, whether surface fairlead sheave or subsea chaser, providing an unobstructed force transfer to lever arms 20 and 30.

Figures 19, 20:
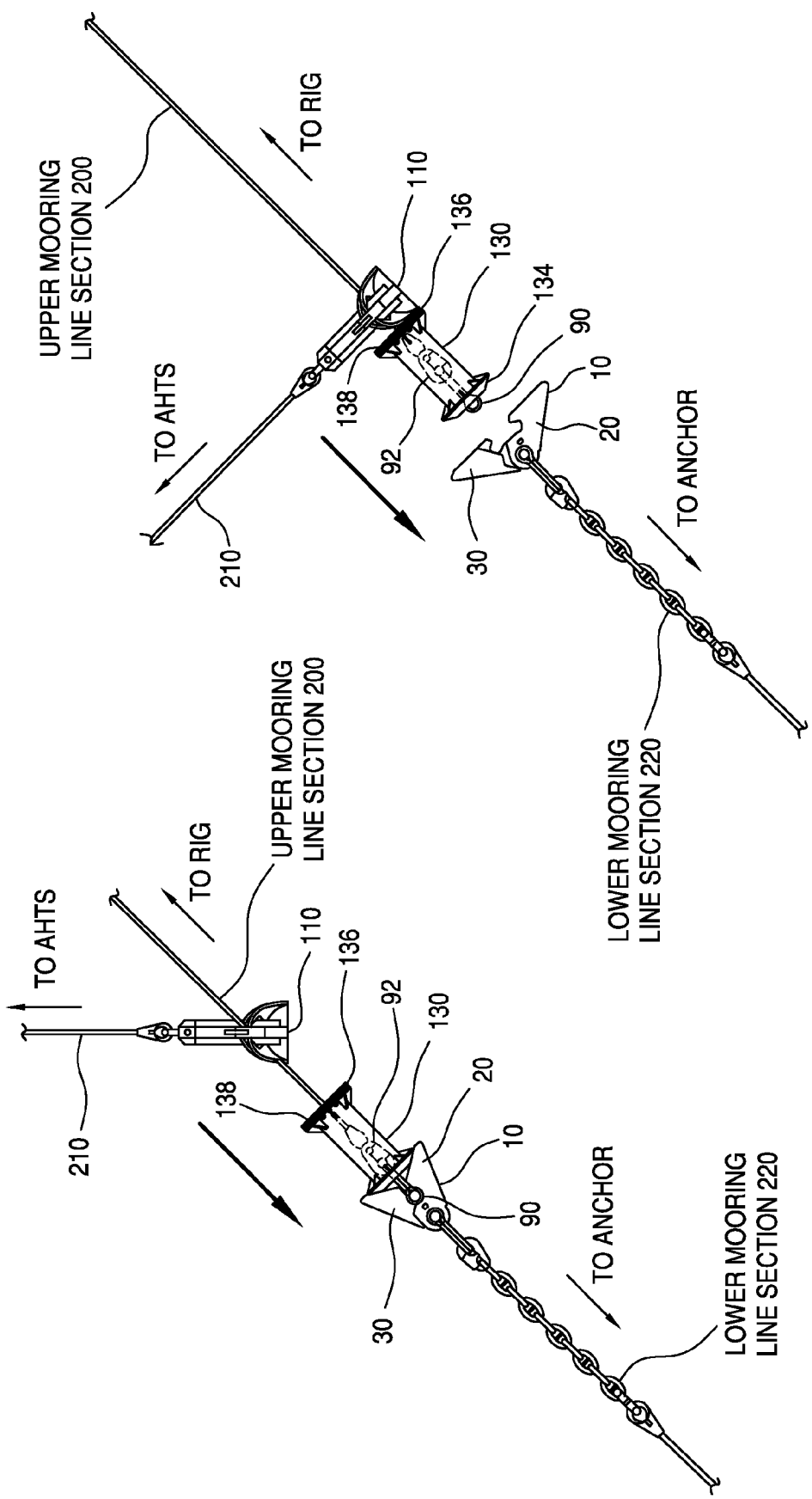
FIGS. 19 and 20 are detailed views of a mode of triggering or disconnecting the disconnect device, referred to an an "intervention triggering" procedure or method.

FIGS. 19-22 show basic operation of this embodiment of disconnect device 10. FIGS. 19 and 20 illustrate a subsea opening or release of disconnect device 10. A release member in the form of a hook, collar, ring or other suitable means known in the art, designated as chaser 110, is run down the upper mooring line section 200 until it contacts disconnect device 10. Chaser 110 is run on a line 210 extending to a vessel on the surface, typically an anchor handling/tow/supply ("AHTS") vessel. By proper directional pull on line 210, chaser 110 contacts top plate 136 (or bumper 138) of centering device 130, thereby applying force to centering device 130 and thence to the force receiving profile of lever arm members 20 and 30, which extend laterally from the axis of mooring load. As described earlier, a bumper 138 on top plate 136 absorbs at least some of the force between chaser 110 and centering device 130. As can be seen in FIGS. 19 and 20, centering device 130 is sufficiently long to encase not only a portion of shackle 90, but also rigging hardware 92 (seen in phantom lines inside of centering device 130), which is fixed to upper mooring line section 200. Sufficient force is applied to break shear pin 70 and overcome any friction loads, then move lever arm members 20 and 30 to a second, open position, as shown in FIG. 20. When the disconnect device is thus triggered, the retained member, in this example shackle 90, is no longer captured within retaining hole 100 formed by mating slots 22, 32 and is thus disconnected from the disconnect device, in turn disconnecting upper mooring line section 200 and freeing the vessel from the anchor.

Figure 22:
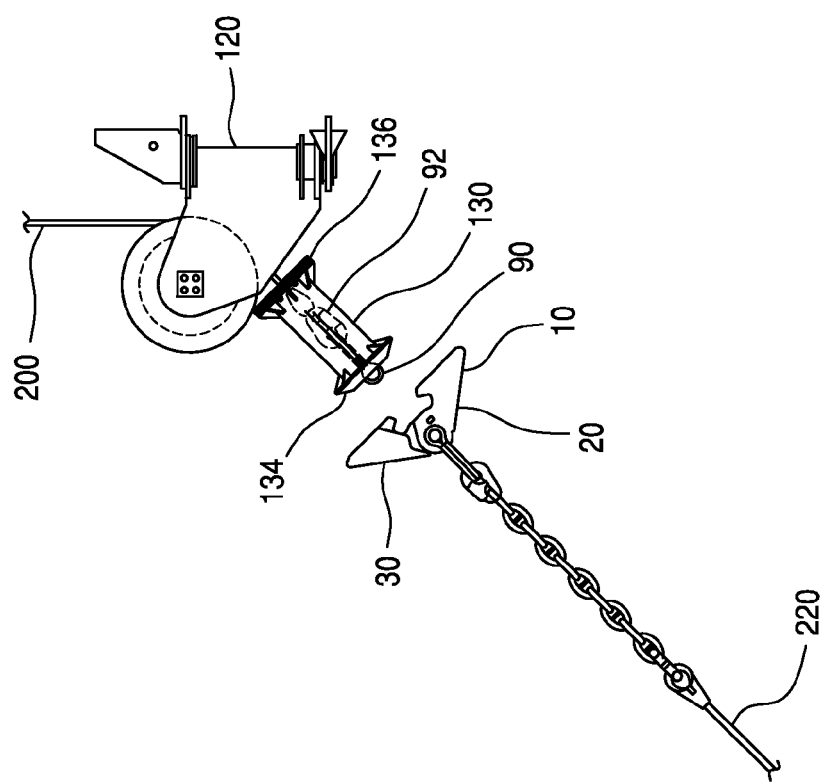
FIGS. 21 and 22 are detailed views of a mode of triggering or disconnecting the disconnect device, referred to an an "active winching" procedure or method.
Figure 21:
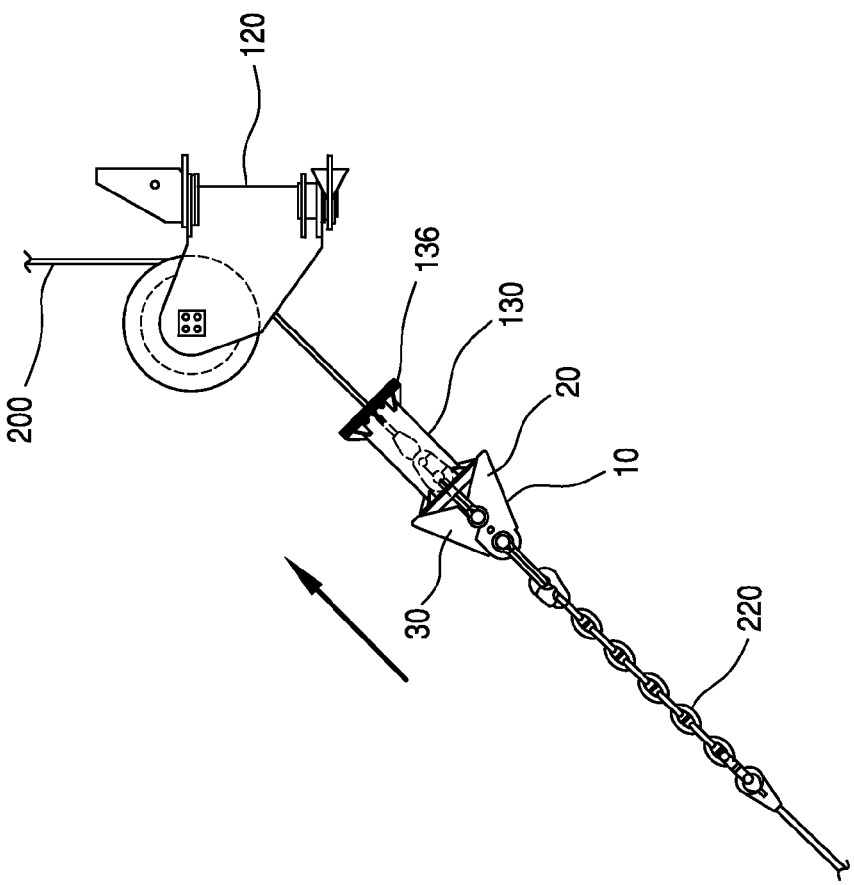

Alternatively, disconnect device 10 can be released by winching disconnect device 10 into contact with a release member (choke point), for example surface fairlead sheave 120, a bollard or other similar device, as seen in FIGS. 21 and 22. Similar to the preceding example, force is then transmitted to the force receiving profile of lever arm members 20 and 30 by centering device 130, thereby forcing lever arm members 20 and 30 outwardly, breaking shear pin 70, overcoming friction loads and moving lever arm members 20 and 30 to their second, released position and disconnecting the upper and lower mooring line sections 200 and 220, as can be seen in FIG. 22. It is to be understood that other types of surface structures would serve as release members to release the disconnect device as it is pulled into the structure, including but not limited to those known as bending shoes or other types of fairlead devices, and including such simple structures as a pair of spaced apart bollards situated on a dock, other vessel, etc.

It is to be understood that the shapes or profiles of lever arm members 20 and 30, including the force receiving profile presented when those two members are in the first or closed position, and of centering device 130, including but not limited to base piece 134, are not confined to the particular shapes pictured. Fundamentally, the shapes need only be such that the force receiving profile formed by surfaces 24 and 34 provide a bearing surface for base profile 134 to push against, and force lever arm members 20 and 30 apart, rotating them around the pivot point of hole 50 (and shackle or other pin therethrough). With regard to lever arm members 20 and 30, and surfaces 24 and 34, while a presently preferred profile yields a "V" shape, other profiles may suit, and the sides of the "V" may be straight, curved, etc. With regard to base profile 134, preferably same is conically shaped to match the angle presented by surfaces 24 and 34, but base profile 134 may alternatively present a more squared-off profile or cross section shape, or a rounded, even partly circular cross section shape. The scope of the invention encompasses all suitable cross section shapes of both the force receiving profile and the base profile of centering device 130.

Materials, Fabrication of the Disconnect Device and Centering Device

Disconnect device 10 and centering device 130 may be fabricated by methods well known in the relevant field, including cutting, welding, etc. Suitable materials are likewise well known in the relevant field, with most components fabricated from metals of suitable composition. Dimensions and strengths of the apparatus can be varied to suit particular applications.

Methods of Use

Broadly, the disconnect device of the present invention may be deployed and used, that is triggered or released by a release member applying force to the force receiving profile of the lever arm members, in two manners: (1) an "active winching" mode, where the disconnect device is triggered or released by pulling the device into a surface fairlead or similar device; and (2) an "intervention triggering" mode, where the disconnect device is triggered or released subsea (while the device is below the surface), by force applied by a chaser device pulled by a surface vessel.

1. Active Winching Mode

Figure 23:
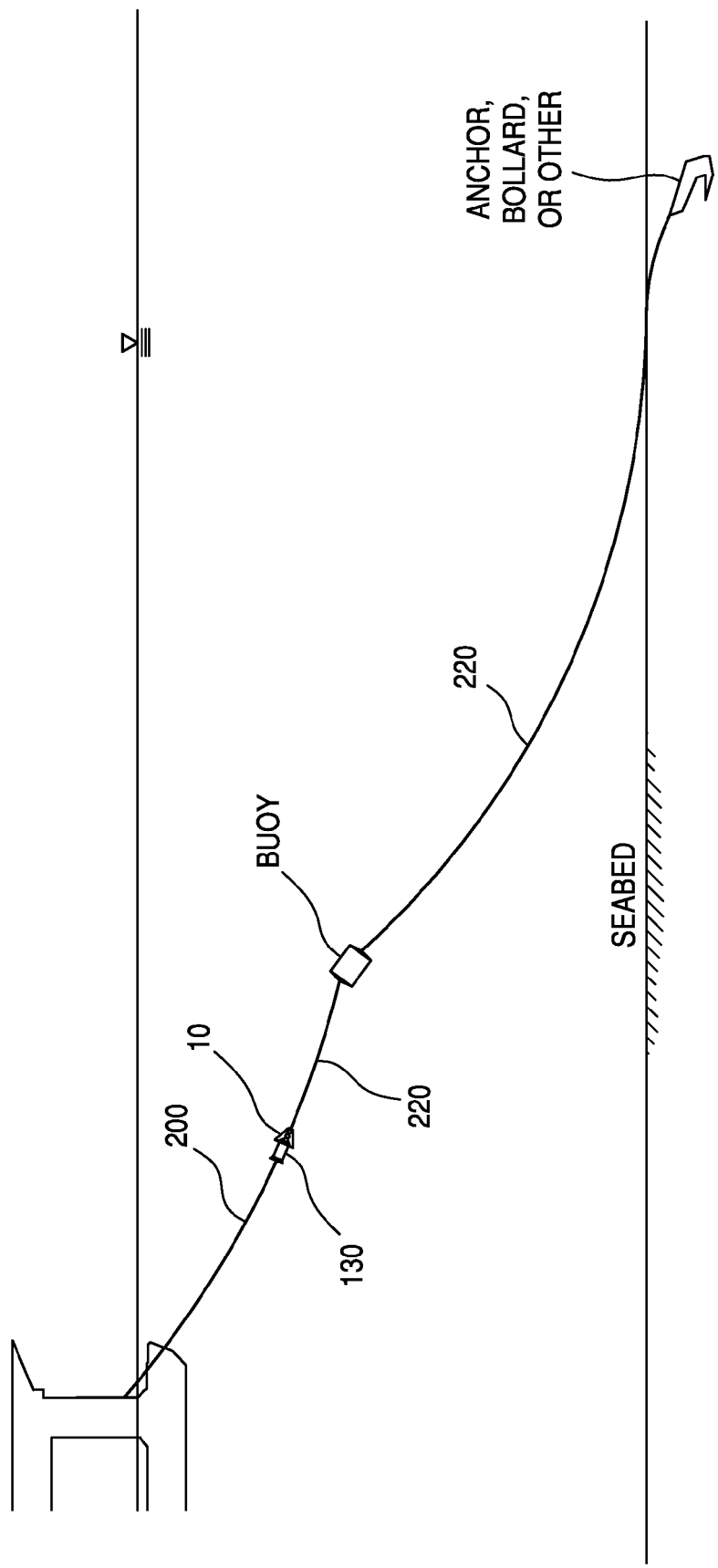
FIGS. 23-27 illustrate the various steps in an active winching triggering or disconnection procedure or method.
Figure 24:
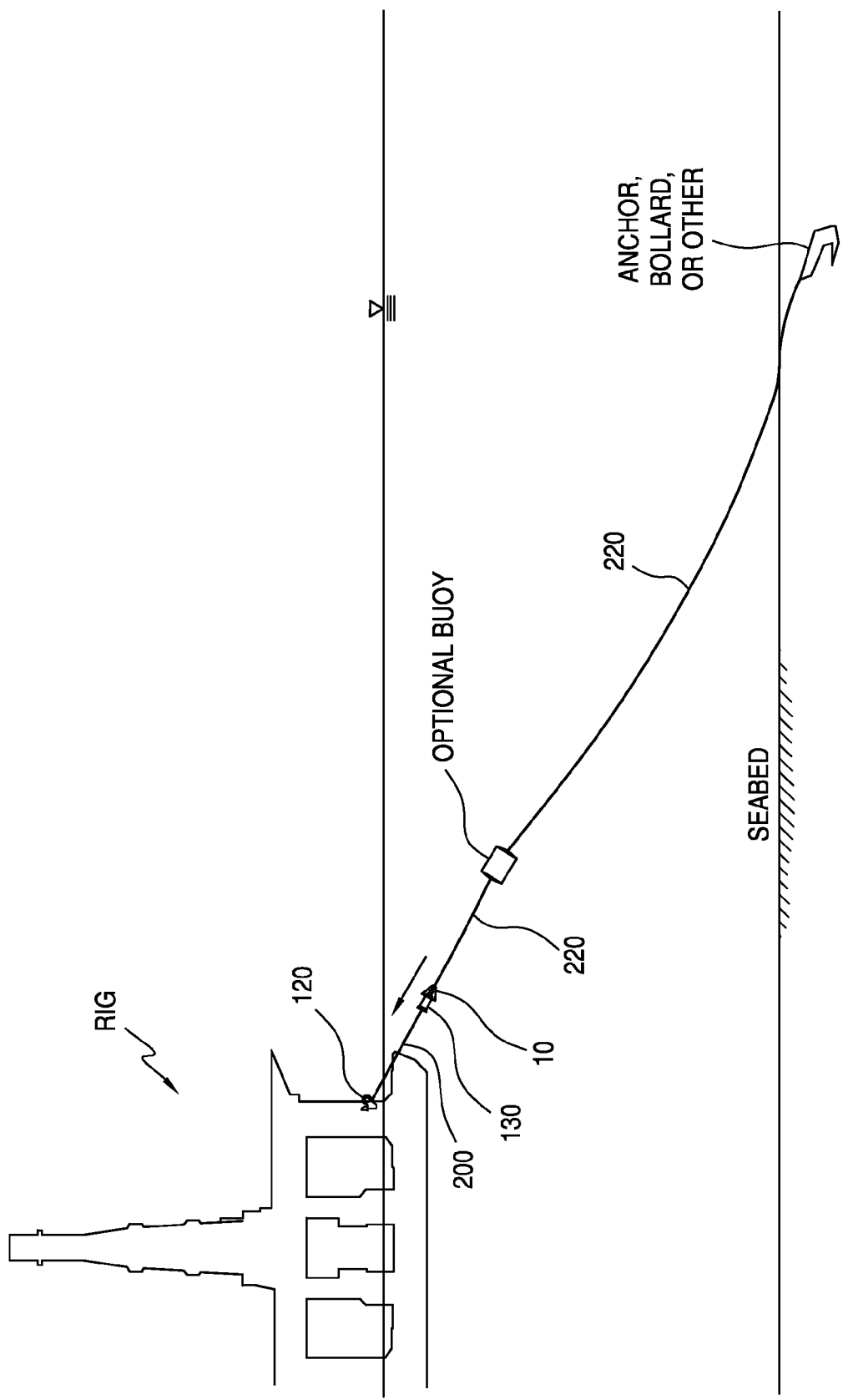
Figure 25:
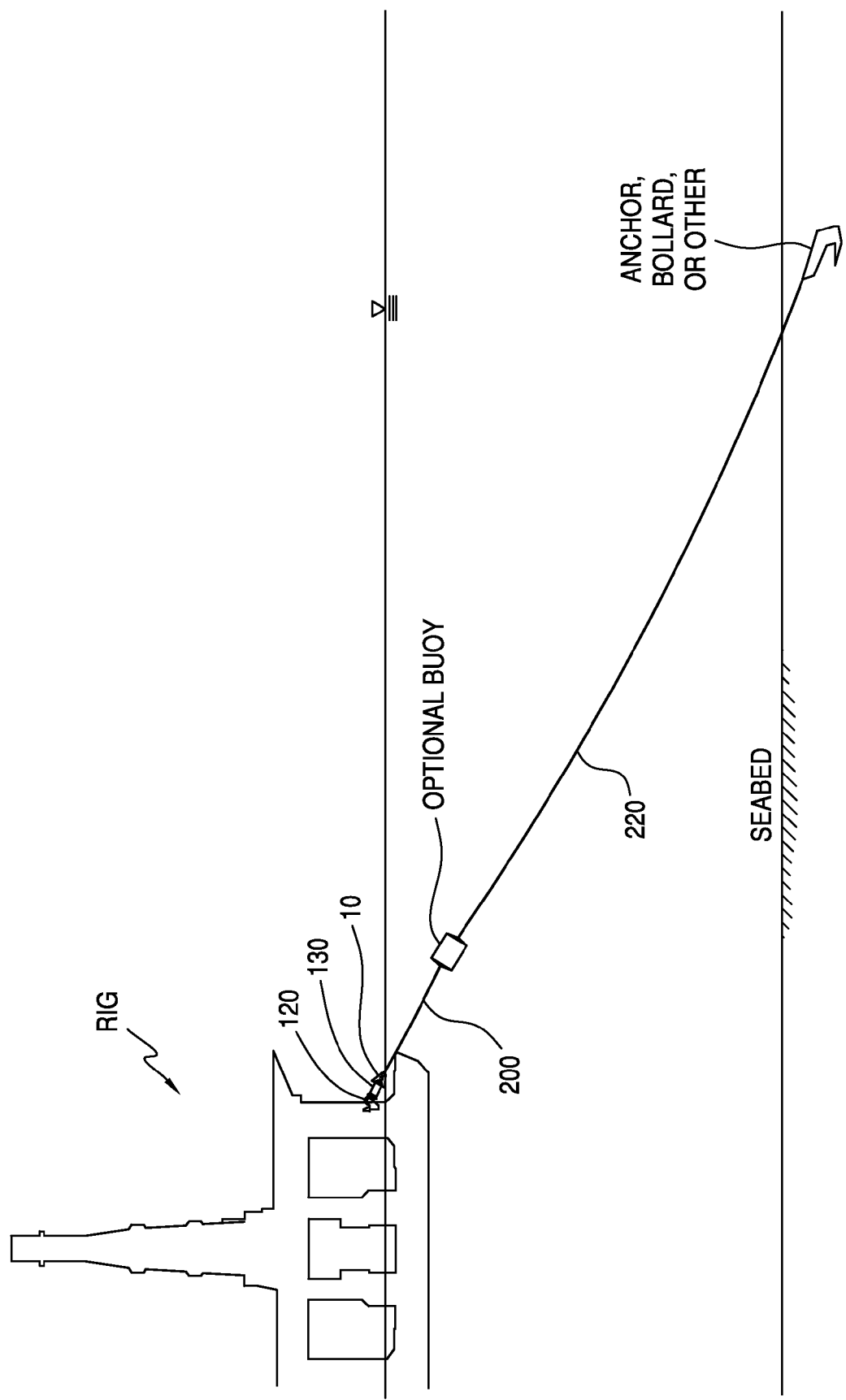
Figure 26:
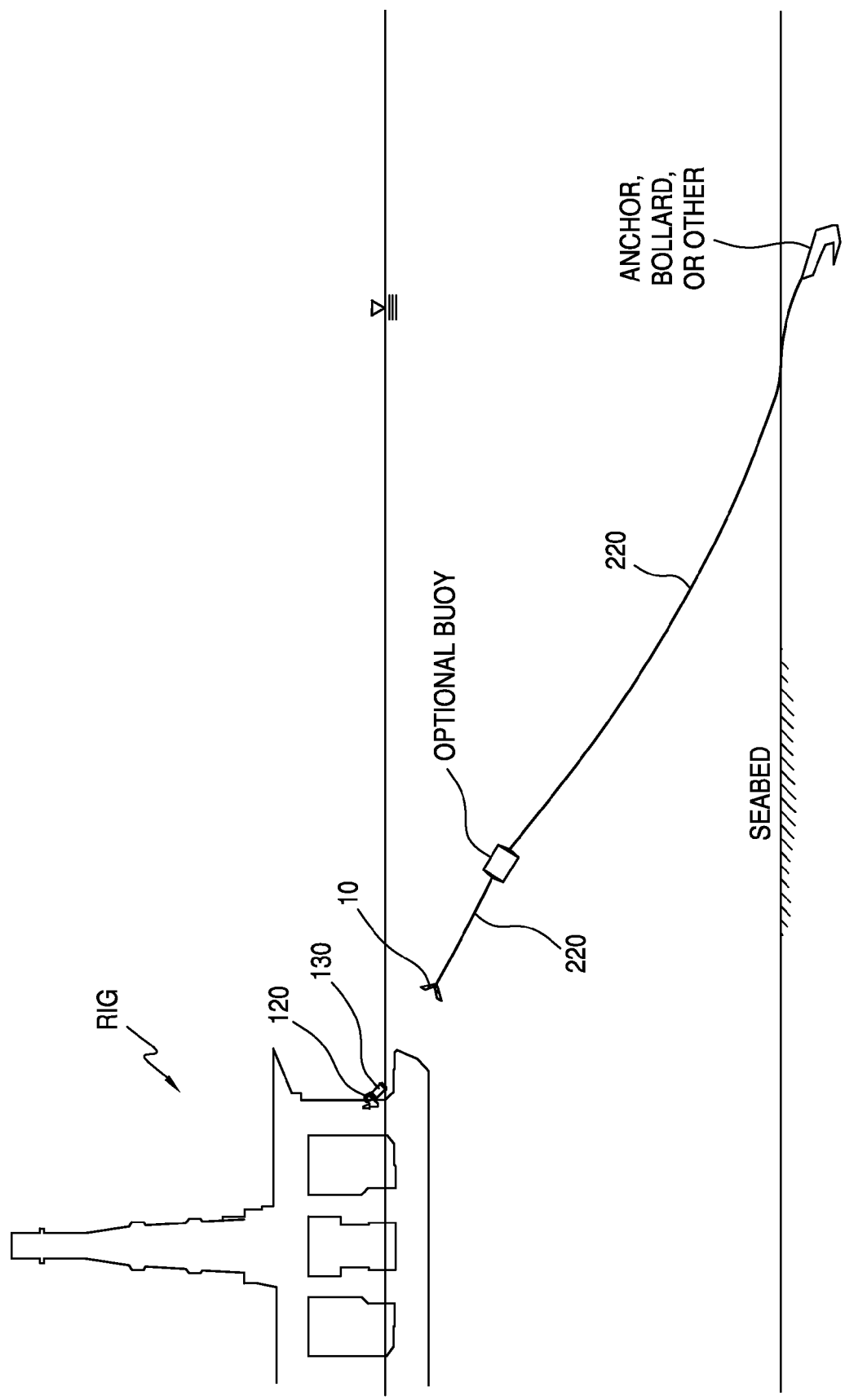
Figure 27:
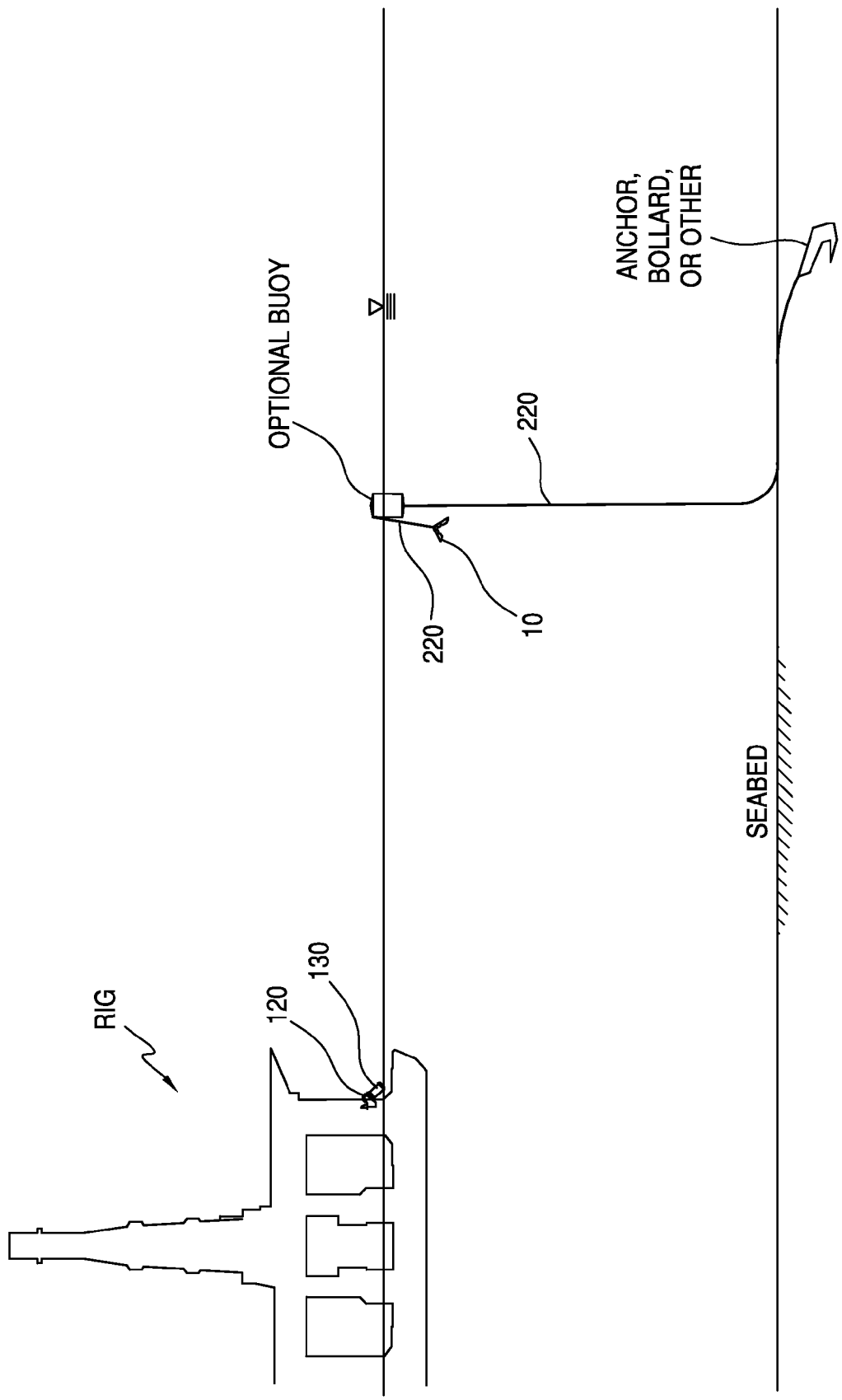

Active winching is the process in which a boat, rig, or other vessel or structure mechanically disconnects its moorings by winching itself towards the disconnect in each line. The vessel will self-disconnect by pulling in wire, chain, or rope through its fairlead or line guide until the force receiving profile of the disconnect device reaches a release member, namely a choke point, such as a surface fairlead or similar device, and the lever arms or centering device are in contact with the surface fairlead. The vessel will then increase tension on the mooring line, thereby increasing force applied to the force receiving profile of the lever arms (either through direct contact or by the centering device), until shear pin 70 is broken, the disconnect device opens and the mooring line is released. With reference to the drawings, particularly FIGS. 23-27, an exemplary method can be described:

a. FIG. 23 shows an example of the type of mooring system in which the disconnect device could be installed. An anchor, bollard or similar device is on or in the seabed. A lower mooring line section 220 extends from the anchor to disconnect device 10. An upper mooring line section 200 extends from disconnect device 10 to the vessel, in this example a rig. Centering device 130 is positioned against disconnect device 10. A buoy (pictured) may optionally be installed in lower mooring line section 220.

b. During an emergency or other event requiring the vessel to utilize the disconnect device to disconnect one or more of its mooring lines, the vessel (in this example, a floating drilling rig, labeled "rig") will engage its mooring winches and maneuver itself down each mooring line until it approaches disconnect device 10 (FIGS. 24 and 25). Depending on the mooring line configuration and status, the vessel may need to payout mooring lines on the opposing side line(s) in order to reach the disconnect device.

c. The vessel will continue to pull in mooring line until disconnect device 10 or centering device 130 is in contact with a release member, in this example surface fairlead 120 on the vessel. Assuming that centering device 130 is being used, the vessel will pull the bumper pad/top plate 138/136 on centering device 130 up against fairlead sheave 120 or line guide until contact is made; further pull will transfer force via centering device 130 to the force receiving profile of lever arm members 20 and 30, eventually breaking shear pin 70, rotating lever arm members 20 and 30 open and releasing disconnect device 10. This is depicted in FIG. 26. Note that this sequence was previously described in connection with FIGS. 21 and 22.

d. One embodiment of the mooring line system employs a buoy on lower mooring line section 220. If such buoy is utilized in the mooring line, then lower mooring line section 220 will drift away from the vessel, with the buoy on the surface of the water and disconnect device 10 suspended from the buoy, as shown in FIG. 27. Otherwise, lower mooring line section 220, with disconnect device 10 attached, will fall to the seafloor. Centering device 130 will remain on upper mooring line section 200 for later reconnection, as shown in FIG. 27. A tow vessel may be attached to the primary vessel to assist in positioning at any point during this operation.

2. Triggering Via Intervention

Figure 28:
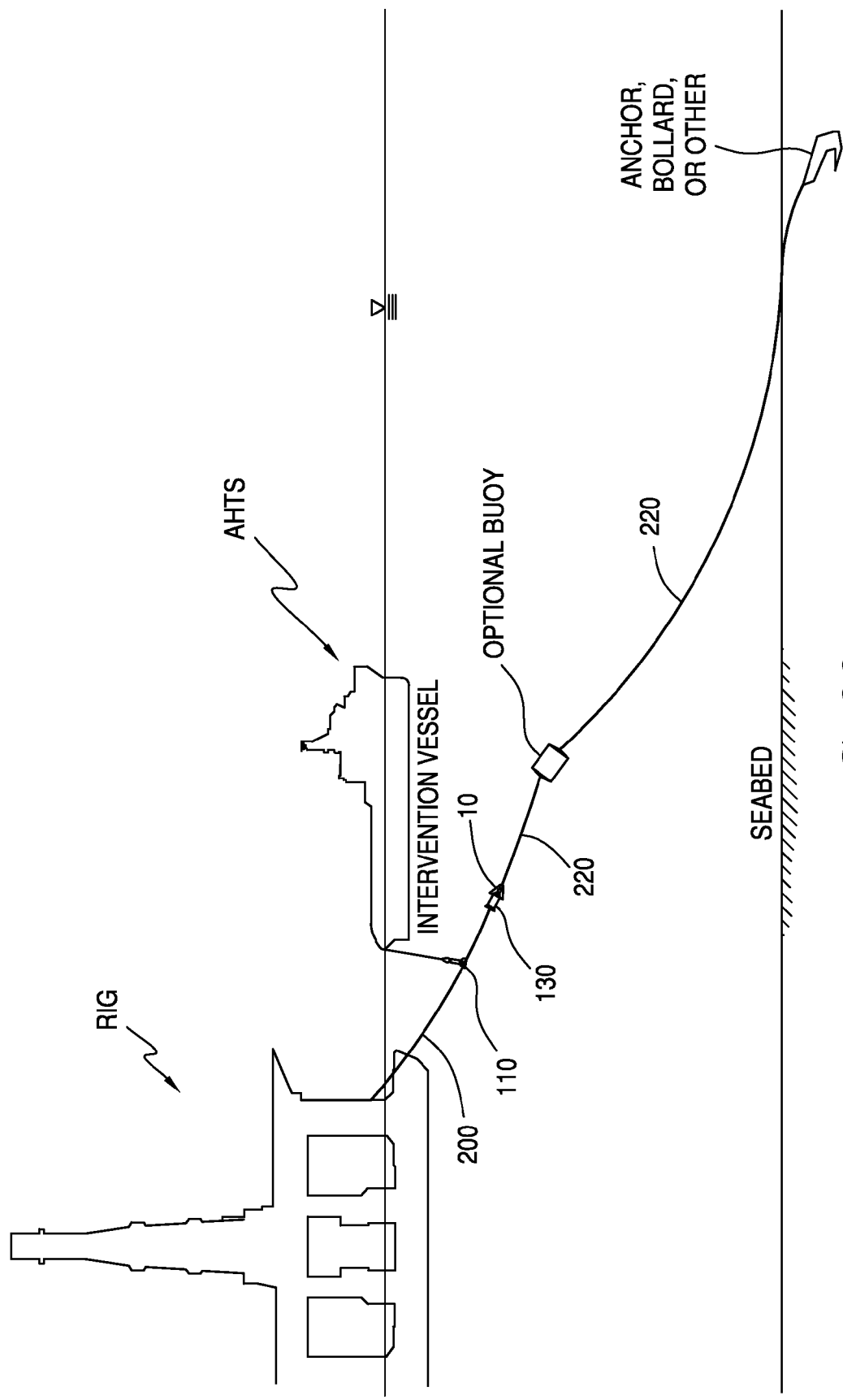
FIGS. 28-34 illustrate the various steps in an intervention triggering or disconnection procedure or method.
Figure 29:
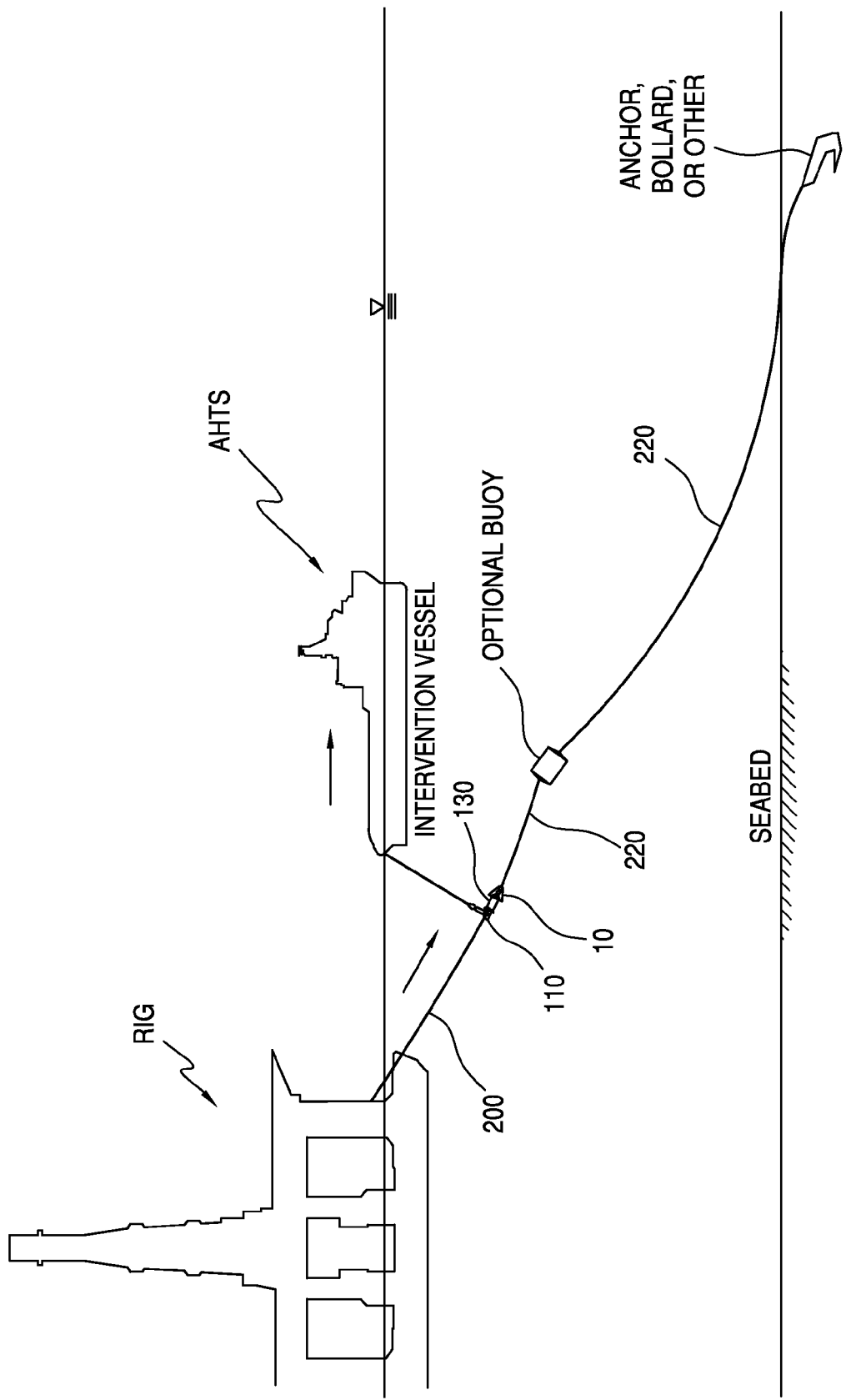
Figure 30:
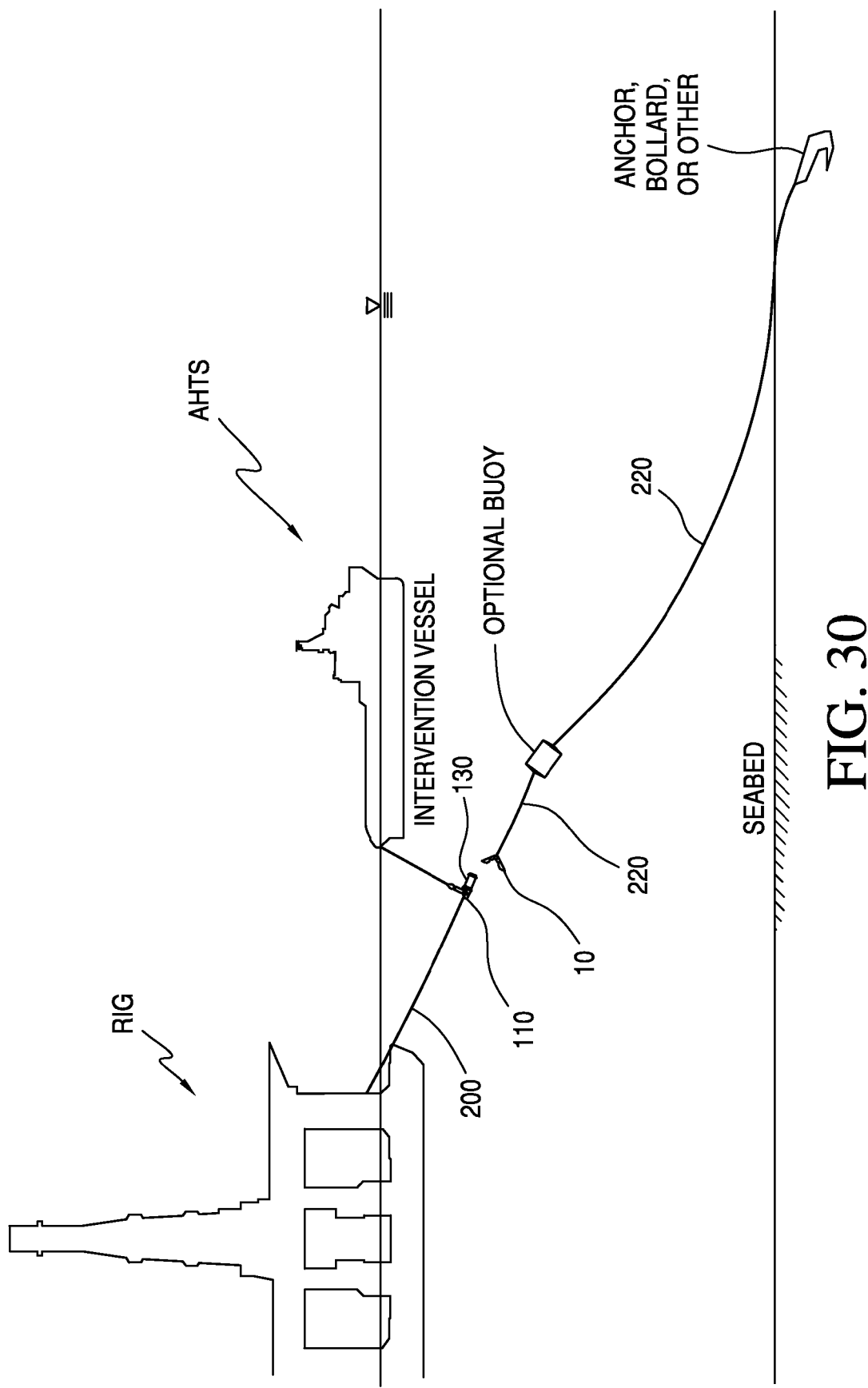
Figure 31:
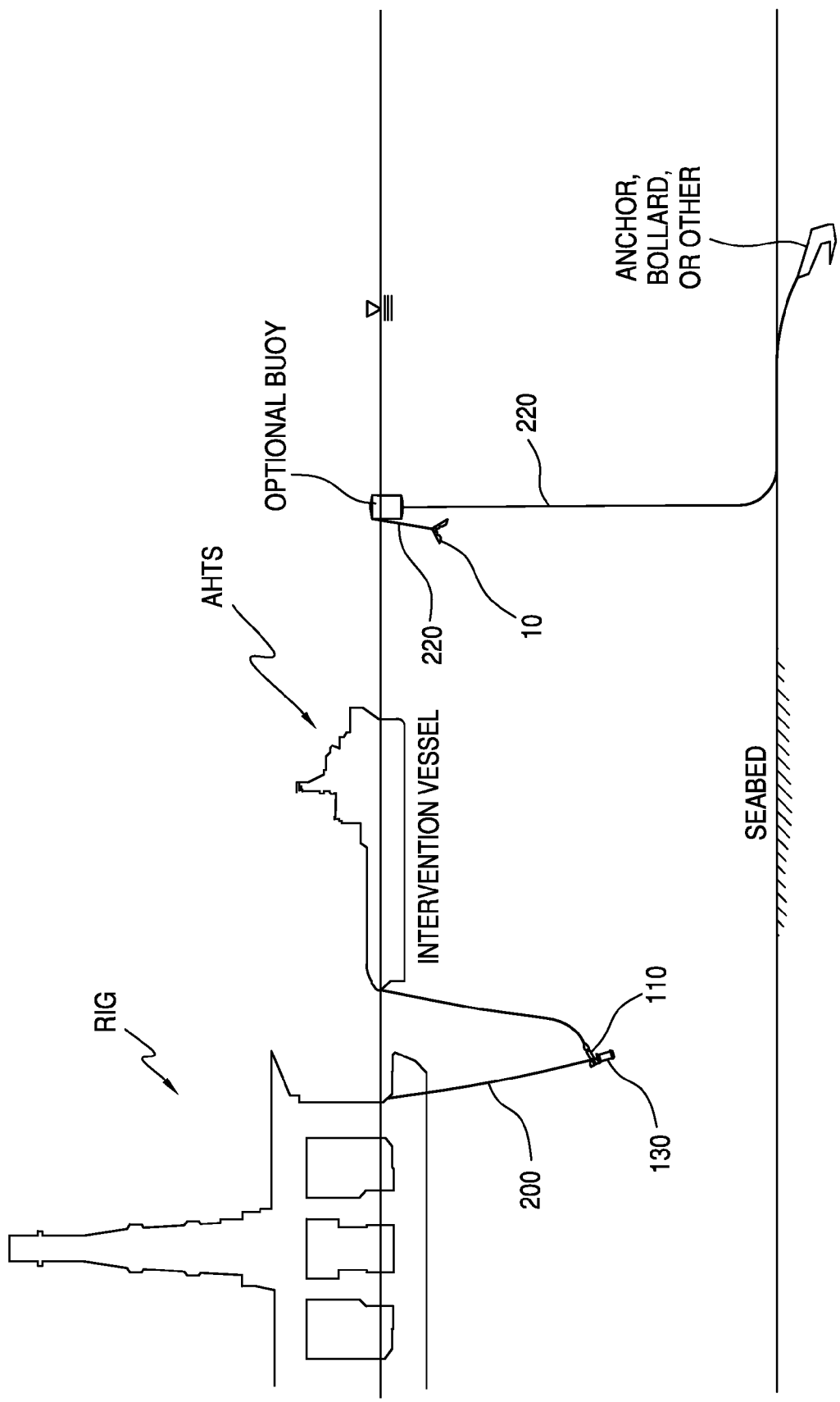
Figure 32:
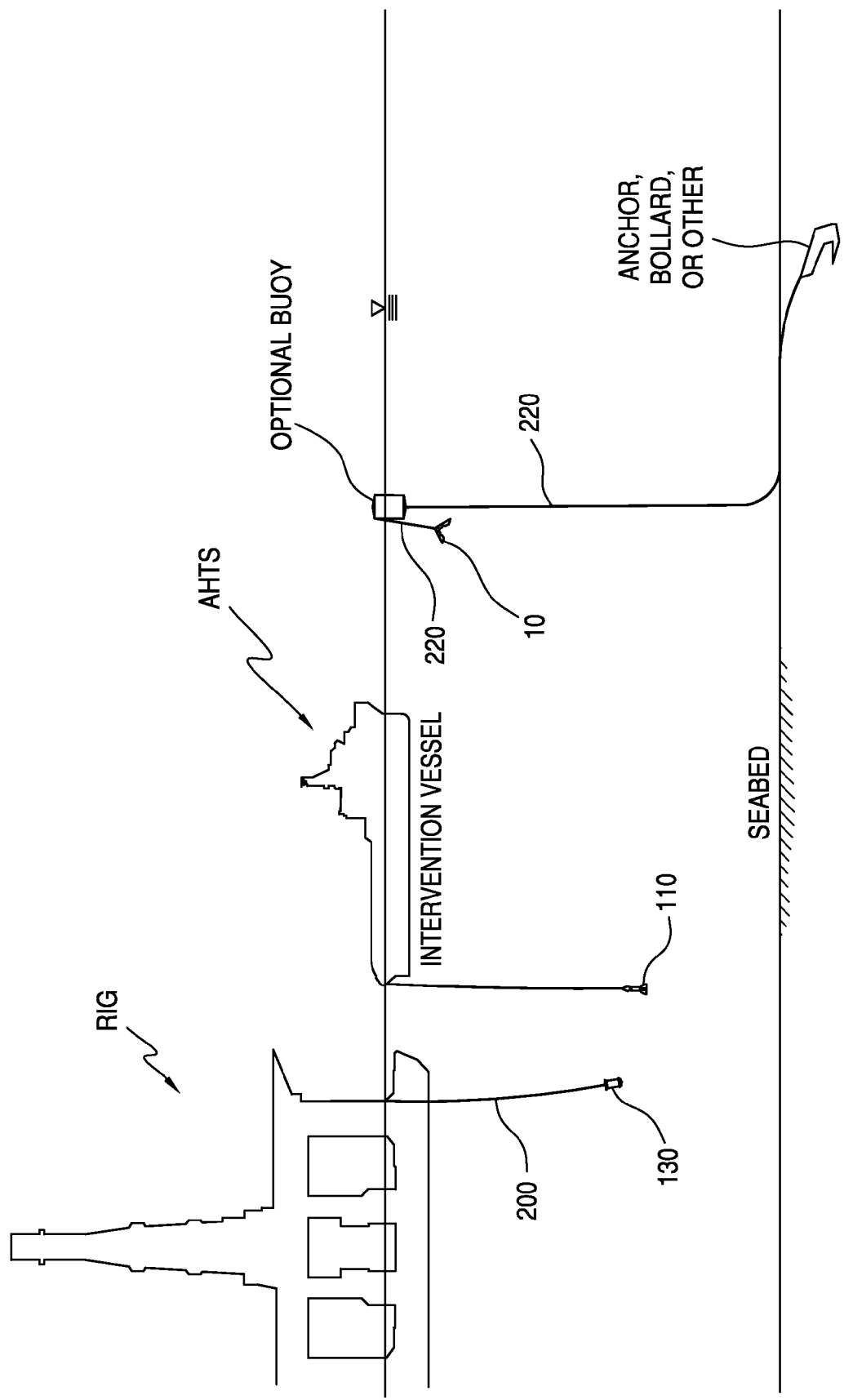
Figure 33:
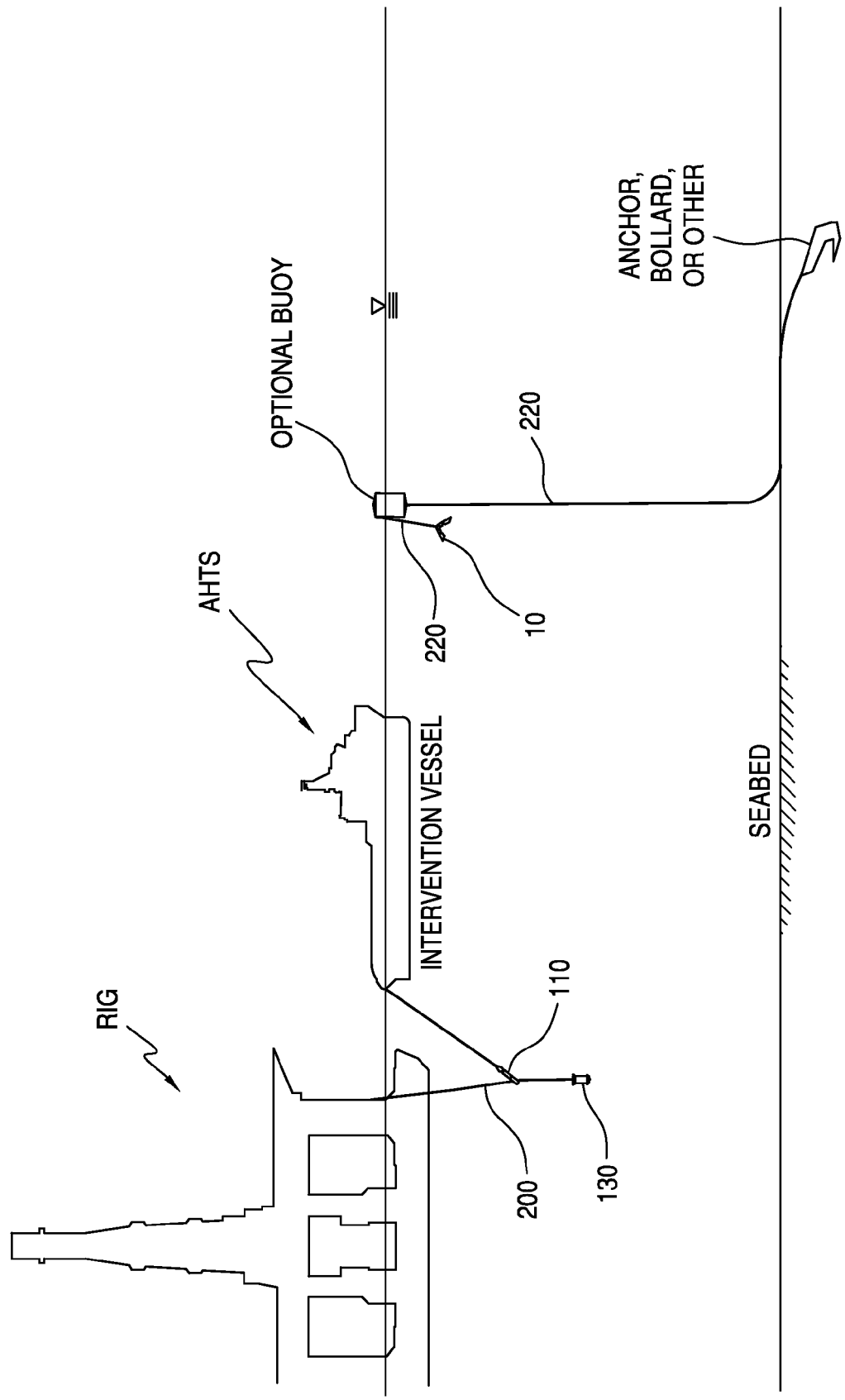
Figure 34:
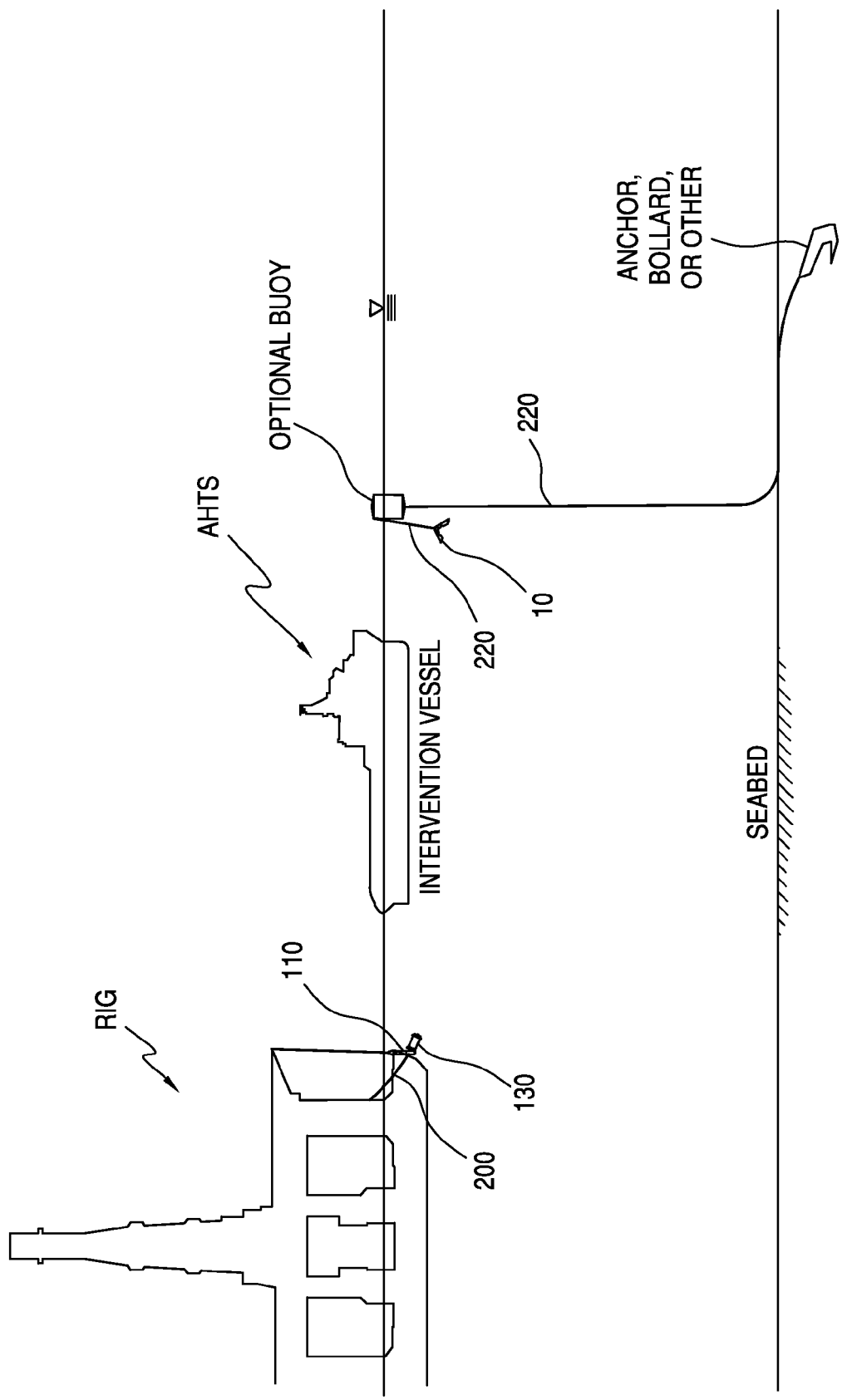

Triggering the disconnect device by intervention is the process in which a secondary "intervention" vessel, such as an AHTS vessel, uses a release member in the form of a hook, ring, collar or similar "chaser" device (labeled element 110) to transfer force to the force receiving profile of lever arms 20 and 30, and thus disconnect the mooring line(s) on the primary vessel by chasing away from the primary vessel. The "chaser" would then contact and transfer force to the disconnect device, namely the centering device thereon (or the lever arm members directly if no centering device was in use). The AHTS will apply tension to the chaser device via a line, sufficient to impart enough force to break the shear pin, and the disconnect device would open and release the retained member and hence the mooring line (see FIGS. 19 and 20). With reference to the drawings, particularly FIGS. 28-34, an exemplary method can be further described:

a. FIG. 23 shows an example of the type of mooring system in which the disconnect device could be installed.

b. During an emergency or other event requiring the moored vessel to utilize disconnect device 10, an "intervention" vessel, such as an AHTS, tug boat, barge, or other vessel, is used to disconnect the primary moored vessel from its moorings. The "intervention" vessel will deploy a release member in the form of an open hook or similar device to catch the mooring line near the primary vessel. Alternatively, the primary vessel may pass a hook, ring, or collar, such as a permanent chain chaser (PCC), through which the mooring line is already threaded, to the "intervention" vessel (FIG. 28). As earlier noted, all of such apparatus are broadly referred to as chaser 110.

c. The intervention vessel will deploy its own chase line components to a designated length, and increase pull on chase line 210, allowing chaser 110 to travel down the upper mooring line section 200 until it contacts disconnect device 10 or centering device 130 (FIG. 29).

d. As chaser 110 contacts and comes to a stop at disconnect device 10 or centering device 130, tension on line 210 (bollard pull) will be increased to a designated amount. This will in turn transmit force to the force receiving profile of disconnect device lever arms 20 and 30, either directly or as via centering device 130, sufficiently to break the shear pin 70 (FIG. 30) and overcome any friction forces, thus releasing the retained member and disconnect device 10.

e. Referring to FIG. 31, if a buoy is utilized in lower mooring line section 220, then lower mooring line section 220 will drift away from the primary and "intervention" vessels, with disconnect device 10 suspended from the buoy as shown; alternatively, lower mooring line section 220, along with disconnect device 10, will fall to the seafloor. The intervention vessel AHTS will reduce bollard pull and maneuver back toward the primary vessel, as shown in FIG. 31.

f. If the intervention vessel AHTS is utilizing a hook or other detachable chaser, then it will deploy enough of its chase line 210 to disconnect itself from the upper mooring line section 200, and centering device 130 will remain on upper mooring line section 200 for later reconnection, see FIG. 32.

g. If a ring, collar, or other similar chaser component was passed from the primary vessel to the intervention vessel, then chase line 210 and upper mooring line section 200 will be recovered, chase line 210 will be passed back from the intervention vessel AHTS to the primary vessel (rig), and the centering device will remain on the primary vessel mooring line for later reconnection, see FIGS. 33 and 34.

A tow vessel may need to be attached to the primary vessel to assist in positioning and maintaining tension on the last mooring line as the "intervention" vessel disconnects it.

Installation/Recovery of the Disconnect Device into/from an Offshore Mooring Line Installation of the disconnect device, including the centering device, into a mooring line can be done by methods well known in the relevant art, such methods generally used to install other mooring line components such as connecting links and the like. One common scenario involves installation of the disconnect device into a mooring system, where the anchors and a portion of the lower mooring line sections have been pre-installed, with a buoy holding an end of the lower mooring line section at the surface. The vessel to be moored, for example a rig, is generally positioned within the anchor/buoy spread. The steps of one possible method of installation of the disconnect device may be broadly summarized as:

a work or intervention vessel, which as previously described may be an AHTS, with disconnect device 10 and centering device 130 on board, secures the end of upper mooring line section 200 from the rig. Upper mooring line section 200 may be cable or chain, and typically has some sort of terminal tackle on the end, for example a socket in the case of cable the upper mooring line section is threaded through centering device 130 using tugger lines or similar means centering device 130 is put overboard, and sufficient amount of upper mooring line section 200 is let out that centering device 130 can slide down the resulting catenary disconnect device 10 is then connected to the end of upper mooring line section 200, still on the AHTS, along with any other desired components the AHTS and the buoy (holding an end of a section of lower mooring line section 220) are brought together, and disconnect device 10 and lower mooring line section 220 fastened together the mooring line from the rig to the anchor now complete, the mooring line can be lowered by the intervention vessel and tensioned as desired.

These steps are then repeated for all of the mooring lines in the pattern. Removal of the disconnect device from the mooring lines is generally accomplished by reversing these steps.

CONCLUSION

While the preceding description contains many specificities, it is to be understood that same are presented only to describe some of the presently preferred embodiments of the invention, and not by way of limitation. Changes can be made to various aspects of the invention, without departing from the scope thereof. For example:

dimensions, shapes, and materials of the disconnect device can be varied to suit particular settings;

the shapes of lever arm members can be varied, so as to form different force receiving profiles;

the shape of the centering device can be varied, including the base profile;

the means for retaining the lever arm members in a first, closed position may be a shear pin, ball detent, or other similar structure;

where a shear pin is used, the pin may take a variety of forms, e.g. scored, smooth, etc.;

although the examples given herein contemplate the force receiving profile of the disconnect device generally facing in the direction of the moored vessel, the orientation could be reversed, and for example in the intervention triggering method the release member could be positioned between the disconnect device and the anchor and pulled toward the disconnect device;

the disconnect device can be used anywhere a tension member is used to apply force between objects; for example, in marine environments, in connecting floating structures to one another or to shore facilities; and in onshore applications, in connection with the building of structures, etc.;

the methods of triggering the disconnect device may be altered to suit particular operational situations.

Therefore, the scope of the invention is to be determined not by the illustrative examples set forth above, but by the appended claims and their legal equivalents.

I claim:

1. An apparatus for disconnecting a moored structure from a mooring line, comprising:

first and second rotatably connected lever arm members, rotatable between a first closed position and a second open position, at least one of said lever arm members comprising a slot for holding a retained member;

a means for holding said lever arm members in said first closed position; and wherein said lever arm members, when in said first closed position, form a force receiving profile adapted to receive a release member, whereby when sufficient force is applied to said force receiving profile by said release member, said means for holding said lever arm members in said first closed position is overcome and said release member forces said lever arm members to rotate to said second open position, thereby releasing said retained member.

2. The apparatus of claim 1, wherein said means for holding comprises a shear pin disposed in aligned holes through said first and second lever arm members.

3. The apparatus of claim 1, wherein said means for holding comprises a ball and detent.

4. A disconnect device for incorporation into a mooring line between a moored vessel and an anchor, comprising:
first and second lever arm members, said lever arm members rotatably connected and rotatable between a first closed position and a second open position, said lever arm members comprising mating slots which form a retaining hole when said lever arm members are in said first closed position, said retaining hole adapted to receive and hold a retained member therein;
a means for holding said lever arm members in said first closed position;
wherein said lever arm members in said first closed position form a force receiving profile adapted to receive a release member and characterized as a V shape, whereby when sufficient force is applied to said force receiving profile of said lever arm members by said release member, said means for holding said lever arm members in said first closed position is overcome and said lever arm members are forced apart and rotated open, thereby releasing a retained member therefrom.

5. The disconnect device of claim 4, wherein said disconnect device further comprises comprises a centering device disposed in said mooring line, said centering device having a base profile adapted to engage said force receiving profile of said lever arm members and force said lever arm members apart, and said release member transmits force through said centering device.

6. The disconnect device of claim 5, wherein said centering device comprises an elongated cylindrical body with said base profile on one end, and further comprises a bumper on the opposite end.

7. The disconnect device of claim 6, wherein said means for holding said lever arm members in said first closed position comprises a shear pin inserted through aligned holes in said lever arm members, when said lever arm members are in said first, closed position.

8. The disconnect device of claim 6, wherein said means for holding said lever arm members in said first closed position comprises a ball and detent.

9. The disconnect device of claim 4, wherein said means for holding said lever arm members in said first closed position comprises a shear pin inserted through aligned holes in said lever arm members, when said lever arm members are in said first, closed position.

10. The disconnect device of claim 4, wherein said means for holding said lever arm members in said first closed position comprises a ball and detent.

11. A mooring line assembly, for mooring a floating vessel in an offshore environment, comprising:
a lower mooring line section attached to an anchor;
an upper mooring line section attached to said floating vessel;
a disconnect device disposed between said upper and lower mooring line sections, comprising:
a pair of rotatably connected lever arm members rotatable between a first, closed position, in which said upper and lower mooring line sections are joined, and a second, open position, in which said upper and lower mooring line sections are disconnected from one another;
a means for holding said lever arm members in said first, closed position;
said lever arm members of said disconnect device forming a force receiving profile in said first closed position which is adapted to receive a release member whereby, when force is applied to said force receiving profile by a release member, forces said lever arm members rotationally apart, opening said first and second lever arm members and disconnecting said upper and lower mooring line sections.

12. The mooring line assembly of claim 11, wherein said release member comprises a centering device disposed in said upper mooring line section between said disconnect device and said floating vessel, and wherein force is applied to said force receiving profile through said centering device.

13. The mooring line assembly of claim 12, wherein said force receiving profile of said disconnect device comprises a V-shaped profile, and said centering device comprises an elongated body and a base profile on one end, adapted to engage said V-shaped force receiving profile and force said lever arm members apart upon the application of force to said disconnect device.

14. The mooring line assembly of claim 13, wherein said centering device comprises a bumper surface on the end opposite said base profile.

15. The mooring line assembly of claim 14, wherein said a means for holding said lever arm members in a first, closed position comprises a shear pin inserted through aligned holes in said lever arm members when in said first closed position.

16. The mooring line assembly of claim 12, wherein said a means for holding said lever arm members in a first, closed position comprises a shear pin inserted through aligned holes in said lever arm members when in said first closed position.

17. A method for disconnecting upper and lower mooring line sections mooring a floating vessel, comprising the steps of:
providing a floating vessel moored to an anchor by a mooring line, said mooring line comprising upper and lower mooring line sections, and a disconnect device connecting said upper and lower mooring line sections when said disconnect device is in a first, closed position;
wherein said disconnect device comprises first and second lever arm members, said lever arm members rotatably connected and rotatable between a first closed position and a second open position, said lever arm members comprising mating slots which form a retaining hole when said lever arm members are in said first closed position, said retaining hole adapted to receive and hold a retained member therein;
a means for holding said lever arm members in said first closed position;
wherein said lever arm members in said first closed position form a force receiving profile characterized as a V shape adapted to receive a release member,
pulling said disconnect device into said release member on said vessel, thereby applying force to said force receiving profile on said disconnect device, said force being sufficient to rotate said first and second lever arm members to an open position, thereby
opening said disconnect device by said application of force; and
releasing a retained member and disconnecting said upper and lower mooring line sections.

18. The method of claim 17, further comprising a centering device positioned in said upper mooring line section, and wherein said force is transmitted from said release member to said disconnect device through said centering device.

19. A method for disconnecting upper and lower mooring line sections mooring a floating vessel, comprising the steps of:

provforming a floating vessel moored to an anchor by a mooring line, said mooring line comprising upper and lower mooring line sections, and a disconnect device connecting said upper and lower mooring line sections when said disconnect device is in a first, closed position, said disconnect device comprising:

first and second lever arm members, said lever arm members rotatably connected and rotatable between a first closed position and a second open position, said lever arm members comprising mating slots which form a retaining hole when said lever arm members are in said first closed position, said retaining hole adapted to receive and hold a retained member therein; and a means for holding said lever arm members in said first closed position;

wherein said lever arm members in said first closed position form a force receiving profile adapted to engage a release member and characterized as a V shape, whereby when sufficient force is applied to said force receiving profile of said lever arm members by said release member, said lever arm members are forced apart and rotated open;

running a release member comprising a chaser device on a line from an intervention vessel, on said mooring line, positioning said chaser device into operable relationship with said force receiving profile on said disconnect device and imparting a sufficient level of force to said force receiving profile on said disconnect device;

opening said disconnect device by said application of force; and disconnecting said upper and lower mooring line sections.

20. The method of claim 19, further comprising a centering device positioned in said upper mooring line section, and wherein said force is transmitted from said chaser device to said disconnect device through said centering device.

* * * * *